(12) United States Patent
Nichols et al.

(10) Patent No.: US 11,727,646 B2
(45) Date of Patent: *Aug. 15, 2023

(54) AUGMENTED REALITY IMAGE OCCLUSION

(71) Applicant: Trimble Inc., Sunnyvale, CA (US)

(72) Inventors: Mark Nichols, Christchurch (NZ); Darrin Hurd, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,308

(22) Filed: Apr. 10, 2019

(65) Prior Publication Data
US 2020/0327732 A1  Oct. 15, 2020

(51) Int. Cl.
*G06T 19/00* (2011.01)
*G06T 15/10* (2011.01)
*G01S 19/13* (2010.01)
*H04N 23/54* (2023.01)

(52) U.S. Cl.
CPC ............ *G06T 19/006* (2013.01); *G01S 19/13* (2013.01); *G06T 15/10* (2013.01); *H04N 23/54* (2023.01)

(58) Field of Classification Search
CPC ..... G06T 19/006; G06T 7/55; G06T 2215/16; G06T 2207/10028; G06T 17/05; G06T 17/00; G06T 2207/30244; G06T 7/60; G06T 19/00; G06T 19/003; G06T 2200/04; G06T 2200/08; G06T 7/70; G06T 15/205; G06T 2207/20212; G06F 30/13; G06F 16/5854; G06F 16/29; G06F 3/04815; G06F 3/012
See application file for complete search history.

(56) References Cited

U.S. PATENT DOCUMENTS

| | | | |
|---|---|---|---|
| 2004/0105573 A1* | 6/2004 | Neumann | G06T 17/00 382/103 |
| 2006/0209065 A1* | 9/2006 | Lapidous | G06T 15/40 345/422 |
| 2009/0293012 A1* | 11/2009 | Alter | G06T 15/10 715/848 |
| 2014/0267700 A1* | 9/2014 | Wang | G06K 9/00664 348/135 |

(Continued)

*Primary Examiner* — Weiming He
(74) *Attorney, Agent, or Firm* — Kilpatrick Townsend & Stockton LLP

(57) ABSTRACT

Techniques for occluding displayable content on a portable electronic device. An EDM device of the portable electronic device may capture a world distance map comprising a plurality of distances to a plurality of points. A camera of the portable electronic device may capture a camera image containing the plurality of points. A geospatial position of a GNSS receiver may be detected. A geospatial position of the camera may be calculated based on the geospatial position of the GNSS receiver. An angle sensor may detect an orientation of the camera. A model image may be generated based on a 3D model, the orientation of the camera, and the geospatial position of the camera. The model image and/or the camera image may be occluded based on the world distance map and the 3D model. A superimposed image comprising the camera image and the model image may be generated and displayed.

17 Claims, 24 Drawing Sheets

(56) References Cited

U.S. PATENT DOCUMENTS

| | | | |
|---|---|---|---|
| 2016/0125656 A1* | 5/2016 | James | G02B 27/0101 |
| | | | 345/633 |
| 2018/0180416 A1* | 6/2018 | Edelman | G01S 19/53 |
| 2018/0188384 A1* | 7/2018 | Ramanandan | G01S 19/53 |
| 2018/0217429 A1† | 8/2018 | Busch | |
| 2019/0258058 A1* | 8/2019 | Fortin-Deschenes et al. | |
| | | | G06F 3/011 |
| 2019/0387216 A1* | 12/2019 | Hicks | H04N 13/275 |

\* cited by examiner
† cited by third party

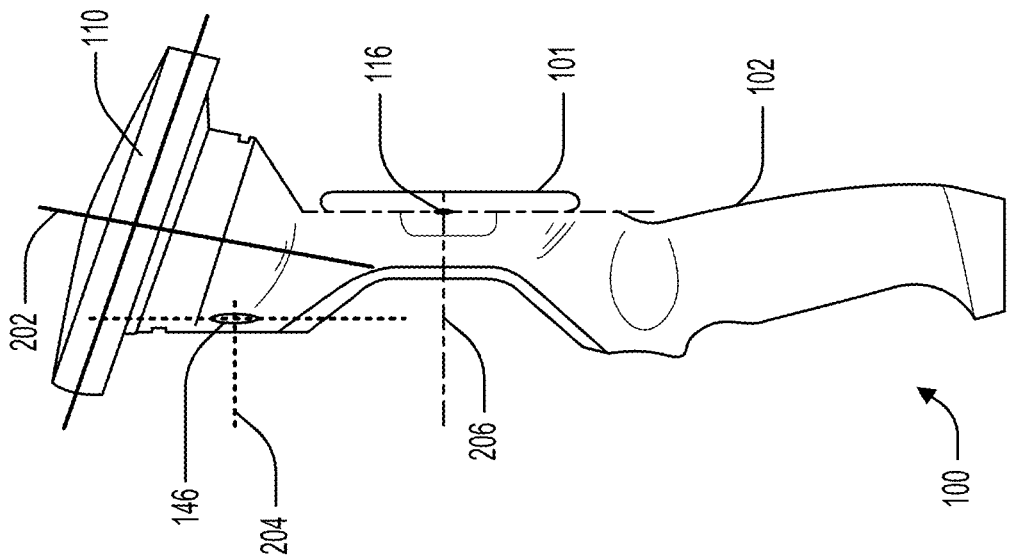
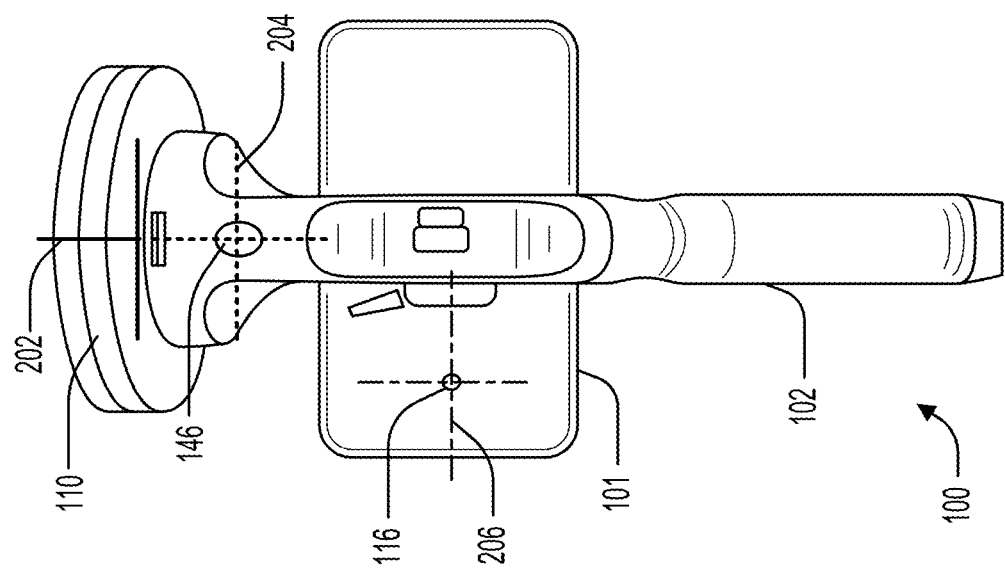
FIG. 2A
FIG. 2B

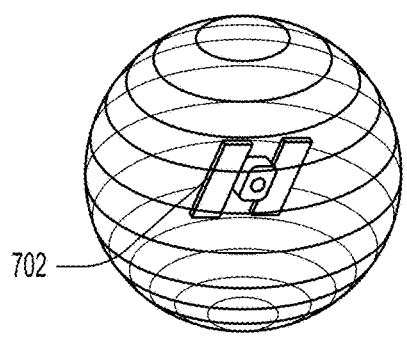
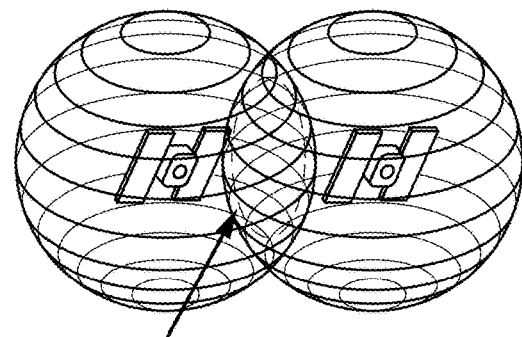
FIG. 9A　　　　　　　　　FIG. 9B
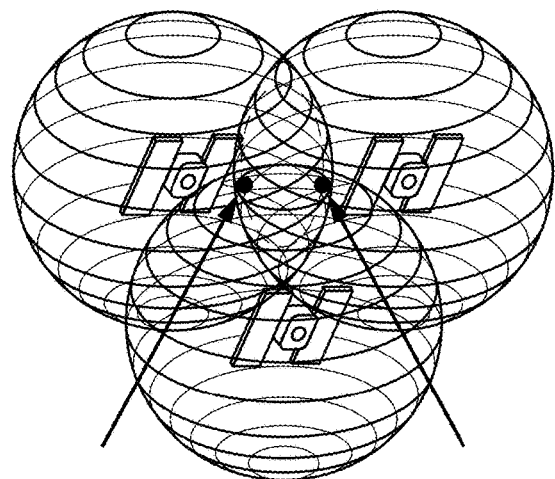
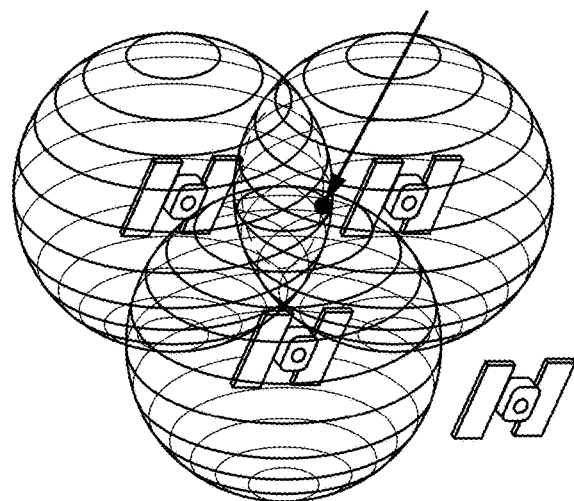
FIG. 9C　　　　　　　　　FIG. 9D

AUGMENTED REALITY IMAGE OCCLUSION

BACKGROUND

The recent growth of virtual reality (VR) and augmented reality (AR) technologies has been remarkable. In most implementations, VR and AR systems include devices that allow digitally reproduced images to be presented to a user in a manner wherein they seem to be, or may be perceived as, real. A VR scenario typically involves presentation of digital or virtual image information without transparency to other actual real-world visual input, whereas an AR scenario typically involves presentation of digital or virtual image information as an augmentation to visualization of the actual world around the user.

Global navigation satellite systems (GNSS) use wireless signals that are transmitted from medium Earth orbit (MEO) satellites to GNSS receivers to determine position and velocity information for the GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing.

Despite the progress of VR and AR technologies, linking VR and AR devices to high-accuracy GNSS data has proven difficult. Accordingly, there is a need in the art for improved methods and systems related to VR and AR technology.

SUMMARY

A summary of the inventions are given below in reference to a series of examples. As used below, any reference to a series of examples is to be understood as a reference to each of those examples disjunctively (e.g., "Examples 1-4" is to be understood as "Examples 1, 2, 3, or 4").

Example 1 is a method for calculating a geospatial position of a point of interest using a portable electronic device, the method comprising: observing, by a camera of the portable electronic device, the point of interest, capturing, by an electronic distance measuring (EDM) device of the portable electronic device, a distance to the point of interest, detecting an orientation of the EDM device, detecting a geospatial position of a global navigation satellite system (GNSS) receiver of the portable electronic device, calculating a geospatial position of the EDM device based on the geospatial position of the GNSS receiver, and calculating the geospatial position of the point of interest based on the geospatial position of the EDM device, the orientation of the EDM device, and the distance to the point of interest.

Example 2 is the method of example(s) 1, wherein the portable electronic device is an augmented reality (AR) device.

Example 3 is the method of example(s) 1-2, wherein the portable electronic device comprises a camera component including the camera and a sensor component including the EDM device and the GNSS receiver, and wherein the camera component is separable from and configured to removably attach to the sensor component.

Example 4 is the method of example(s) 1-3, wherein detecting the orientation of the EDM device includes: detecting, by an angle sensor of the portable electronic device, an orientation of the angle sensor, wherein the angle sensor is positioned within the camera component, and determining the orientation of the EDM device based on the orientation of the angle sensor and based on a known relationship between the orientation of the angle sensor and the orientation of the EDM device.

Example 5 is the method of example(s) 4, wherein the orientation of the angle sensor and the orientation of the EDM device are related by a component attachment angle between the camera component and the sensor component.

Example 6 is the method of example(s) 3, wherein calculating the geospatial position of the EDM device based on the geospatial position of the GNSS receiver includes: calculating an offset vector extending between the geospatial position of the GNSS receiver and the geospatial position of the EDM device based on a known relationship between the orientation of the EDM device and the offset vector, wherein a magnitude of the offset vector is known, and calculating the geospatial position of the EDM device by modifying the geospatial position of the GNSS receiver with the offset vector.

Example 7 is the method of example(s) 3, wherein detecting the orientation of the EDM device includes: detecting a horizontal angle of the EDM device, and detecting a vertical angle of the EDM device.

Example 8 is the method of example(s) 7, wherein calculating the geospatial position of the point of interest includes: calculating a horizontal distance between the geospatial position of the EDM device and the geospatial position of the point of interest based on the vertical angle and the distance to the point of interest, calculating a vertical distance between the geospatial position of the EDM device and the geospatial position of the point of interest based on the vertical angle and the distance to the point of interest, and calculating the geospatial position of the point of interest by modifying the geospatial position of the EDM device with the horizontal distance and the vertical distance.

Example 9 is a portable electronic device configured to calculate a geospatial position of a point of interest, the portable electronic device comprising: a camera, an electronic distance measuring (EDM) device configured to capture a distance to the point of interest, a global navigation satellite system (GNSS) receiver configured to detect a geospatial position of the GNSS receiver, an angle sensor configured to detect an orientation of the angle sensor, and one or more processors communicatively coupled to the camera, the EDM device, and the GNSS receiver, wherein the one or more processors are configured to perform operations comprising: observing, by the camera, the point of interest, calculating an orientation of the EDM device based on the orientation of the angle sensor, calculating a geospatial position of the EDM device based on the geospatial position of the GNSS receiver, and calculating the geospatial position of the point of interest based on the geospatial position of the EDM device, the orientation of the EDM device, and the distance to the point of interest.

Example 10 is the portable electronic device of example(s) 9, wherein the portable electronic device is an augmented reality (AR) device.

Example 11 is the portable electronic device of example(s) 9-10, further comprising: a camera component including the camera, and a sensor component including the EDM device and the GNSS receiver, wherein the camera component is separable from and configured to removably attach to the sensor component.

Example 12 is the portable electronic device of example(s) 9-11, wherein the angle sensor is positioned within the camera component, and wherein calculating the orientation of the EDM device includes: calculating the orientation of the EDM device based on the orientation of the angle sensor and based on a known relationship between the orientation of the angle sensor and the orientation of the EDM device.

Example 13 is the portable electronic device of example(s) 9-12, wherein the orientation of the angle sensor and the orientation of the EDM device are related by a component attachment angle between the camera component and the sensor component.

Example 14 is the portable electronic device of example(s) 11, wherein calculating the geospatial position of the EDM device based on the geospatial position of the GNSS receiver includes: calculating an offset vector extending between the geospatial position of the GNSS receiver and the geospatial position of the EDM device based on a known relationship between the orientation of the EDM device and the offset vector, wherein a magnitude of the offset vector is known, and calculating the geospatial position of the EDM device by modifying the geospatial position of the GNSS receiver with the offset vector.

Example 15 is the portable electronic device of example(s) 11, wherein detecting the orientation of the EDM device includes: detecting a horizontal angle of the EDM device, and detecting a vertical angle of the EDM device.

Example 16 is the portable electronic device of example(s) 15, wherein calculating the geospatial position of the point of interest includes: calculating a horizontal distance between the geospatial position of the EDM device and the geospatial position of the point of interest based on the vertical angle and the distance to the point of interest, calculating a vertical distance between the geospatial position of the EDM device and the geospatial position of the point of interest based on the vertical angle and the distance to the point of interest, and calculating the geospatial position of the point of interest by modifying the geospatial position of the EDM device with the horizontal distance and the vertical distance.

Example 17 is a sensor component configured to removably attach to a camera component and to calculate a geospatial position of a point of interest, the sensor component comprising: an electronic distance measuring (EDM) device configured to capture a distance to the point of interest, and a global navigation satellite system (GNSS) receiver configured to detect a geospatial position of the GNSS receiver, wherein, when the sensor component is removably attached to the camera component including one or more processors, the one or more processors are configured to perform operations comprising: observing, by a camera of the camera component, the point of interest, detecting an orientation of the EDM device, calculating a geospatial position of the EDM device based on the geospatial position of the GNSS receiver, and calculating the geospatial position of the point of interest based on the geospatial position of the EDM device, the orientation of the EDM device, and the distance to the point of interest.

Example 18 is the sensor component of example(s) 17, wherein detecting the orientation of the EDM device includes: detecting, by an angle sensor of the camera component, an orientation of the angle sensor, and determining the orientation of the EDM device based on the orientation of the angle sensor and based on a known relationship between the orientation of the angle sensor and the orientation of the EDM device.

Example 19 is the sensor component of example(s) 17-18, wherein calculating the geospatial position of the EDM device based on the geospatial position of the GNSS receiver includes: calculating an offset vector extending between the geospatial position of the GNSS receiver and the geospatial position of the EDM device based on a known relationship between the orientation of the EDM device and the offset vector, wherein a magnitude of the offset vector is known, and calculating the geospatial position of the EDM device by modifying the geospatial position of the GNSS receiver with the offset vector.

Example 20 is the sensor component of example(s) 17-19, wherein detecting the orientation of the EDM device includes: detecting a horizontal angle of the EDM device, and detecting a vertical angle of the EDM device.

Example 21 is a method for occluding displayable content on a portable electronic device, the method comprising: capturing, by an electronic distance measuring (EDM) device of the portable electronic device, a world distance map comprising a plurality of distances to a plurality of points, capturing, by a camera of the portable electronic device, a camera image containing the plurality of points, detecting a geospatial position of a global navigation satellite system (GNSS) receiver, calculating a geospatial position of the camera based on the geospatial position of the GNSS receiver, detecting an orientation of the camera, generating a model image based on a three-dimensional (3D) model, the orientation of the camera, and the geospatial position of the camera, occluding one or both of the model image and the camera image based on the world distance map and the 3D model, generating a superimposed image comprising the camera image and the model image, and displaying the superimposed image.

Example 22 is the method of example(s) 21, wherein the portable electronic device is an augmented reality (AR) device.

Example 23 is the method of example(s) 21-22, further comprising: receiving model data corresponding to the 3D model, wherein the model data includes at least one geospatial position associated with the 3D model.

Example 24 is the method of example(s) 21-23, wherein occluding one or both of the model image and the camera image based on the world distance map and the 3D model includes: generating a model distance map comprising a plurality of distances to the 3D model, comparing the model distance map to the world distance map, and occluding one or both of the model image and the camera image based on the comparison.

Example 25 is the method of example(s) 21-24, wherein the portable electronic device comprises a camera component including the camera and a sensor component including the EDM device and the GNSS receiver, and wherein the camera component is separable from and configured to removably attach to the sensor component.

Example 26 is the method of example(s) 25, wherein calculating the geospatial position of the camera based on the geospatial position of the GNSS receiver includes: calculating an offset vector extending between the geospatial position of the GNSS receiver and the geospatial position of the camera based on a known relationship between the orientation of the camera and the offset vector, wherein a magnitude of the offset vector is known, and calculating the geospatial position of the camera by modifying the geospatial position of the GNSS receiver with the offset vector.

Example 27 is the method of example(s) 25, wherein detecting the orientation of the EDM device includes: detecting, by an angle sensor of the portable electronic device, an orientation of the angle sensor, wherein the angle sensor is positioned within the camera component, and determining the orientation of the camera based on the orientation of the angle sensor and based on a known relationship between the orientation of the angle sensor and the orientation of the camera.

Example 28 is a portable electronic device configured to occlude displayable content, the portable electronic device comprising: an electronic distance measuring (EDM) device configured to capture a world distance map comprising a plurality of distances to a plurality of points, a camera configured to capture a camera image containing the plurality of points, a global navigation satellite system (GNSS) receiver configured to detect a geospatial position of the GNSS receiver, an angle sensor configured to detect an orientation of the angle sensor, and one or more processors communicatively coupled to the camera, the EDM device, and the GNSS receiver, wherein the one or more processors are configured to perform operations comprising: calculating a geospatial position of the camera based on the geospatial position of the GNSS receiver, calculating an orientation of the camera based on the orientation of the angle sensor, generating a model image based on a three-dimensional (3D) model, the orientation of the camera, and the geospatial position of the camera, occluding one or both of the model image and the camera image based on the world distance map and the 3D model, generating a superimposed image comprising the camera image and the model image, and displaying the superimposed image.

Example 29 is the portable electronic device of example(s) 28, wherein the portable electronic device is an augmented reality (AR) device.

Example 30 is the portable electronic device of example(s) 28-29, wherein the operations further comprise: receiving model data corresponding to the 3D model, wherein the model data includes at least one geospatial position associated with the 3D model.

Example 31 is the portable electronic device of example(s) 28-30, wherein occluding one or both of the model image and the camera image based on the world distance map and the 3D model includes: generating a model distance map comprising a plurality of distances to the 3D model, comparing the model distance map to the world distance map, and occluding one or both of the model image and the camera image based on the comparison.

Example 32 is the portable electronic device of example(s) 28-31, wherein the portable electronic device comprises a camera component including the camera and a sensor component including the EDM device and the GNSS receiver, and wherein the camera component is separable from and configured to removably attach to the sensor component.

Example 33 is the portable electronic device of example(s) 32, wherein calculating the geospatial position of the camera based on the geospatial position of the GNSS receiver includes: calculating an offset vector extending between the geospatial position of the GNSS receiver and the geospatial position of the camera based on a known relationship between the orientation of the camera and the offset vector, wherein a magnitude of the offset vector is known, and calculating the geospatial position of the camera by modifying the geospatial position of the GNSS receiver with the offset vector.

Example 34 is the portable electronic device of example(s) 32, wherein the angle sensor is positioned within the camera component, and wherein calculating the orientation of the camera includes: calculating the orientation of the camera based on the orientation of the angle sensor and based on a known relationship between the orientation of the angle sensor and the orientation of the camera.

Example 35 is a sensor component configured to removably attach to a camera component and to occlude displayable content, the portable electronic device comprising: an electronic distance measuring (EDM) device configured to capture a world distance map comprising a plurality of distances to a plurality of points, and a global navigation satellite system (GNSS) receiver configured to detect a geospatial position of the GNSS receiver, wherein, when the sensor component is removably attached to the camera component including one or more processors, the one or more processors are configured to perform operations comprising: capturing, by a camera of the camera component, a camera image containing the plurality of points, detecting, by an angle sensor of the camera component, an orientation of the angle sensor, calculating a geospatial position of the camera based on the geospatial position of the GNSS receiver, calculating an orientation of the camera based on the orientation of the angle sensor, generating a model image based on a three-dimensional (3D) model, the orientation of the camera, and the geospatial position of the camera, occluding one or both of the model image and the camera image based on the world distance map and the 3D model, generating a superimposed image comprising the camera image and the model image, and displaying the superimposed image.

Example 36 is the sensor component of example(s) 35, wherein the sensor component and the camera component, when attached, form an augmented reality (AR) device.

Example 37 is the sensor component of example(s) 35-36, wherein the operations further comprise: receiving model data corresponding to the 3D model, wherein the model data includes at least one geospatial position associated with the 3D model.

Example 38 is the sensor component of example(s) 35-37, wherein occluding one or both of the model image and the camera image based on the world distance map and the 3D model includes: generating a model distance map comprising a plurality of distances to the 3D model, comparing the model distance map to the world distance map, and occluding one or both of the model image and the camera image based on the comparison.

Example 39 is the sensor component of example(s) 35-38, wherein calculating the geospatial position of the camera based on the geospatial position of the GNSS receiver includes: calculating an offset vector extending between the geospatial position of the GNSS receiver and the geospatial position of the camera based on a known relationship between the orientation of the camera and the offset vector, wherein a magnitude of the offset vector is known, and calculating the geospatial position of the camera by modifying the geospatial position of the GNSS receiver with the offset vector.

Example 40 is the sensor component of example(s) 35-39, wherein calculating the orientation of the camera includes: calculating the orientation of the camera based on the orientation of the angle sensor and based on a known relationship between the orientation of the angle sensor and the orientation of the camera, calculating a geospatial position of the EDM device based on the geospatial position of the GNSS receiver, and calculating the geospatial position of the point of interest based on the geospatial position of the EDM device, the orientation of the EDM device, and the distance to the point of interest.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIGS. 2A and 2B illustrate front and side views of an AR device when a camera component is attached to a sensor component, according to some embodiments of the present invention.

FIGS. 9A-9D illustrate a trilateration technique performed by a GNSS receiver to generate a position estimate, according to some embodiments of the present invention.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Figure 1:
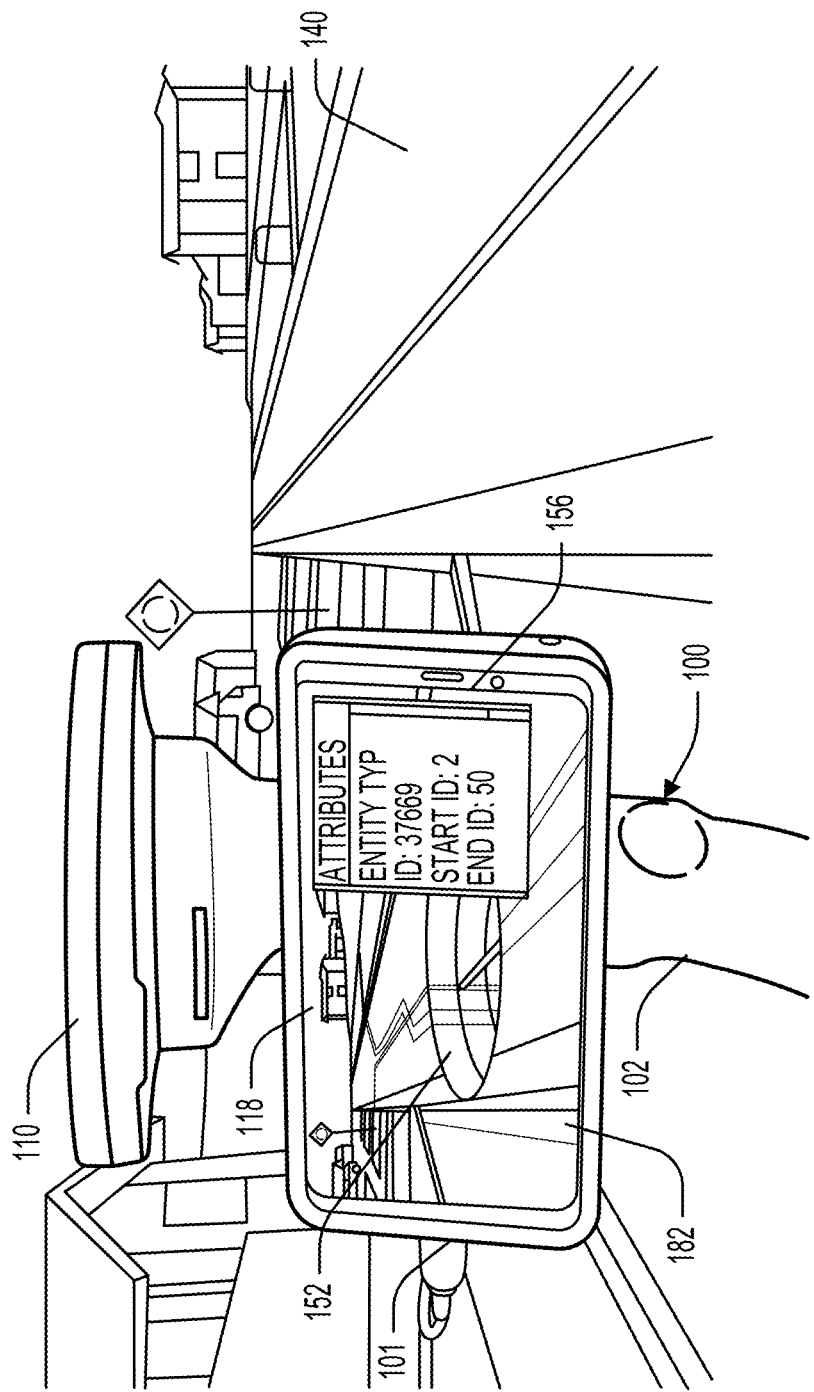
FIG. 1 illustrates an AR device comprising a camera component attached to a sensor component, according to some embodiments of the present invention.

FIG. 1 illustrates an augmented reality (AR) device 100 comprising a camera component 101 attached to a sensor component 102, according to some embodiments of the present invention. AR device 100 may be used at a potential construction site 140 or at any location where three dimensional (3D) rendered models may be displayed and superimposed onto images of real world objects such as the earth, sky, water, stationary objects (e.g., roads, trees, buildings, etc.), movable objects (e.g., people, animals, vehicles, etc.), among other possibilities. Camera component 101 may include a camera 116 (not shown in FIG. 1) for capturing a camera image 118 and a display 156 for displaying a model image 152 (e.g., an underground utility) that is superimposed onto camera image 118, collectively referred to as a superimposed image 182. Sensor component 102 may include a GNSS receiver 110 for providing high-accuracy position data of GNSS receiver 110. When the spatial relationship between GNSS receiver 110 and a camera of AR device 100 is known, the position data generated by GNSS receiver 110 may be used to determine the position of the camera, allowing proper placement of model image 152 onto camera image 118.

In some embodiments, sensor component 102 includes an electronic distance measurement (EDM) device 146 (not shown in FIG. 1) for measuring distances to discrete points within the field of view of camera 116. In some embodiments, EDM device 146 is a lidar device that transmits pulsed laser light towards a point of interest and measures the reflected pulses with a sensor. The distance between the lidar device and the point of interest is estimated based on the return time or on phase measurements of the transmitted light. In some embodiments, EDM device 146 is a radar device that transmits an electromagnetic signal via an antenna towards the point of interest and measures the reflected electromagnetic signal via the transmitting antenna or a different receiving antenna. The distance between the radar device and the point of interest is estimated based on the return time. EDM device 146 may detect distances in a single direction or, in some embodiments, EDM device 146 may generate a distance map comprising a plurality of detected distances and the relative orientation for each distance.

Each of camera component 101 and sensor component 102 may comprise one or more structural components to support the attachment or integration of other components.

For example, sensor component 102 may include a frame that allows attachment or integration of GNSS receiver 110 to the frame and attachment or integration of EDM device 146 to the frame. When attached or integrated to the frame, GNSS receiver 110 may have a known physical relationship to EDM device 146. As another example, camera component 101 may include a structural component that allows camera component 101 to be removably or permanently attached to sensor component 102. Similarly, sensor component 102 may include a structural component that allows sensor component 102 to be removably or permanently attached to camera component 101. The above-described structural components may include screws, bolts, nuts, brackets, clamps, magnets, adhesives, etc., to assist in attachment of the various components.

FIGS. 2A and 2B illustrate front and side views of AR device 100 when camera component 101 is attached to sensor component 102, according to some embodiments of the present invention. In the illustrated embodiment, the position and orientation of GNSS receiver 110 is indicated by crosshairs 202, the position and orientation of EDM device 146 is indicated by crosshairs 204, and the position and orientation of camera 116 is indicated by crosshairs 206. The position of GNSS receiver 110 may correspond to the phase center of the receiver's antenna, the position of EDM device 146 may correspond to the location(s) of the device's emitter and/or receiver, and the position of camera 116 may correspond to a point where the camera aperture is located (in accordance with the pinhole camera model). When camera component 101 is rigidly attached to sensor component 102, detection of the orientation and position of any one of the three devices can be used to obtain the orientations and positions of the other two devices. Furthermore, detection of the orientations and positions of two of the three devices may allow a more accurate calculation of the orientation and position of the remaining device.

Figure 3:
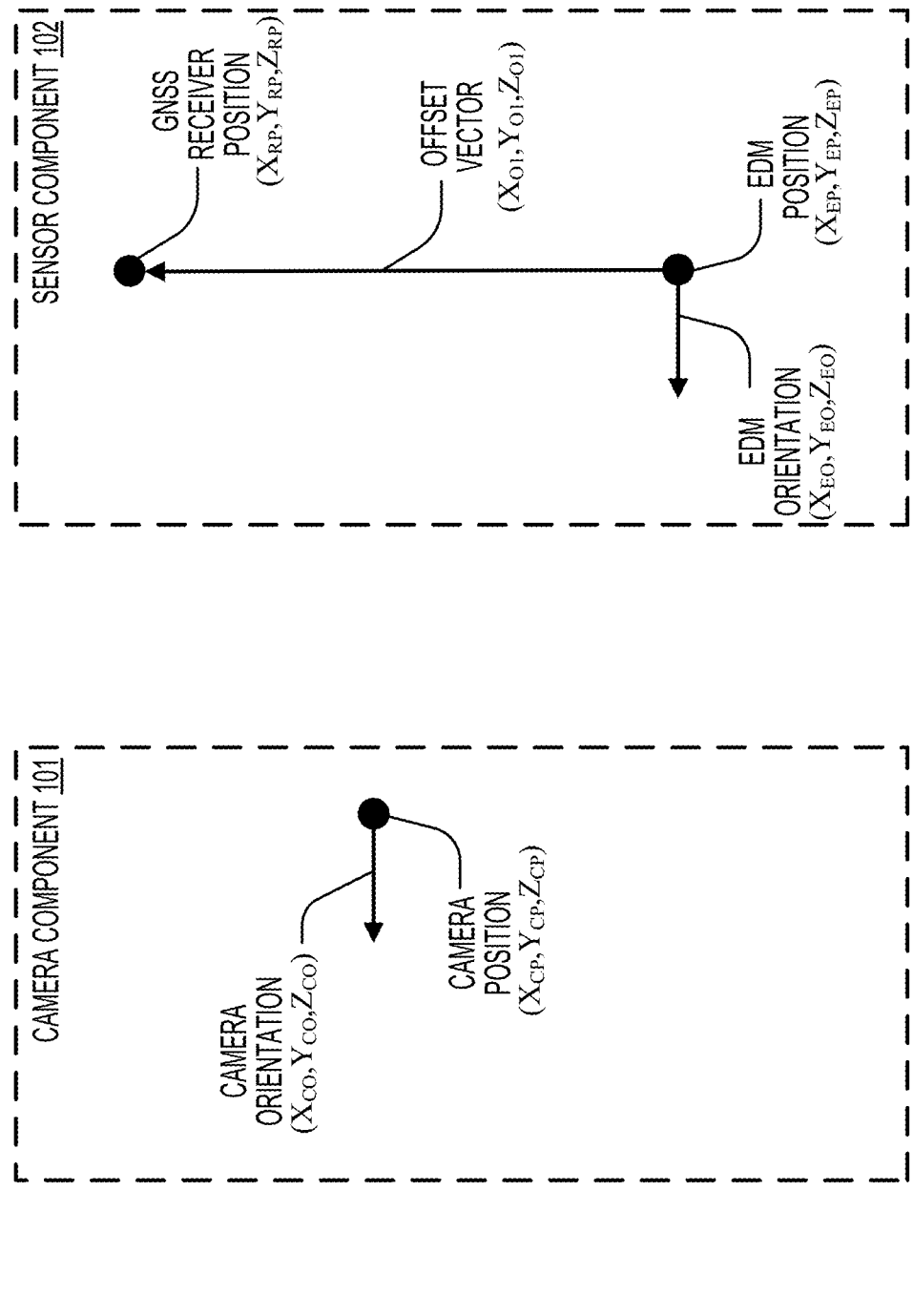
FIG. 3 illustrates a diagram showing position and orientation relationships of an AR device in which a camera component is detached from a sensor component, according to some embodiments of the present invention.

FIG. 3 illustrates a diagram showing position and orientation relationships of AR device 100 in which camera component 101 is detached from sensor component 102, according to some embodiments of the present invention. In the illustrated embodiment, a first offset vector $(X_{O1},Y_{O1},Z_{O1})$ is defined as the vector extending between the position of EDM device 146 $(X_{EP},Y_{EP},Z_{EP})$ and the position of GNSS receiver 110 $(X_{RP},Y_{RP},Z_{RP})$. In some embodiments, knowledge of the first offset vector $(X_{O1},Y_{O1},Z_{O1})$ and either the position of EDM device 146 $(X_{EP},Y_{EP},Z_{EP})$ or the position of GNSS receiver 110 $(X_{RP},Y_{RP},Z_{RP})$ can be used to find the unknown position. In some embodiments, the relationship between (e.g., angle formed by) the first offset vector $(X_{O1},Y_{O1},Z_{O1})$ and the orientation of EDM device 146 $(X_{EO},Y_{EO},Z_{EO})$ is known and may be utilized in a way such that knowledge of the orientation of EDM device 146 $(X_{EO},Y_{EO},Z_{EO})$ and either the position of EDM device 146 $(X_{EP},Y_{EP},Z_{EP})$ or the position of GNSS receiver 110 $(X_{RP},Y_{RP},Z_{RP})$ can be used to find the unknown position.

Figure 4:
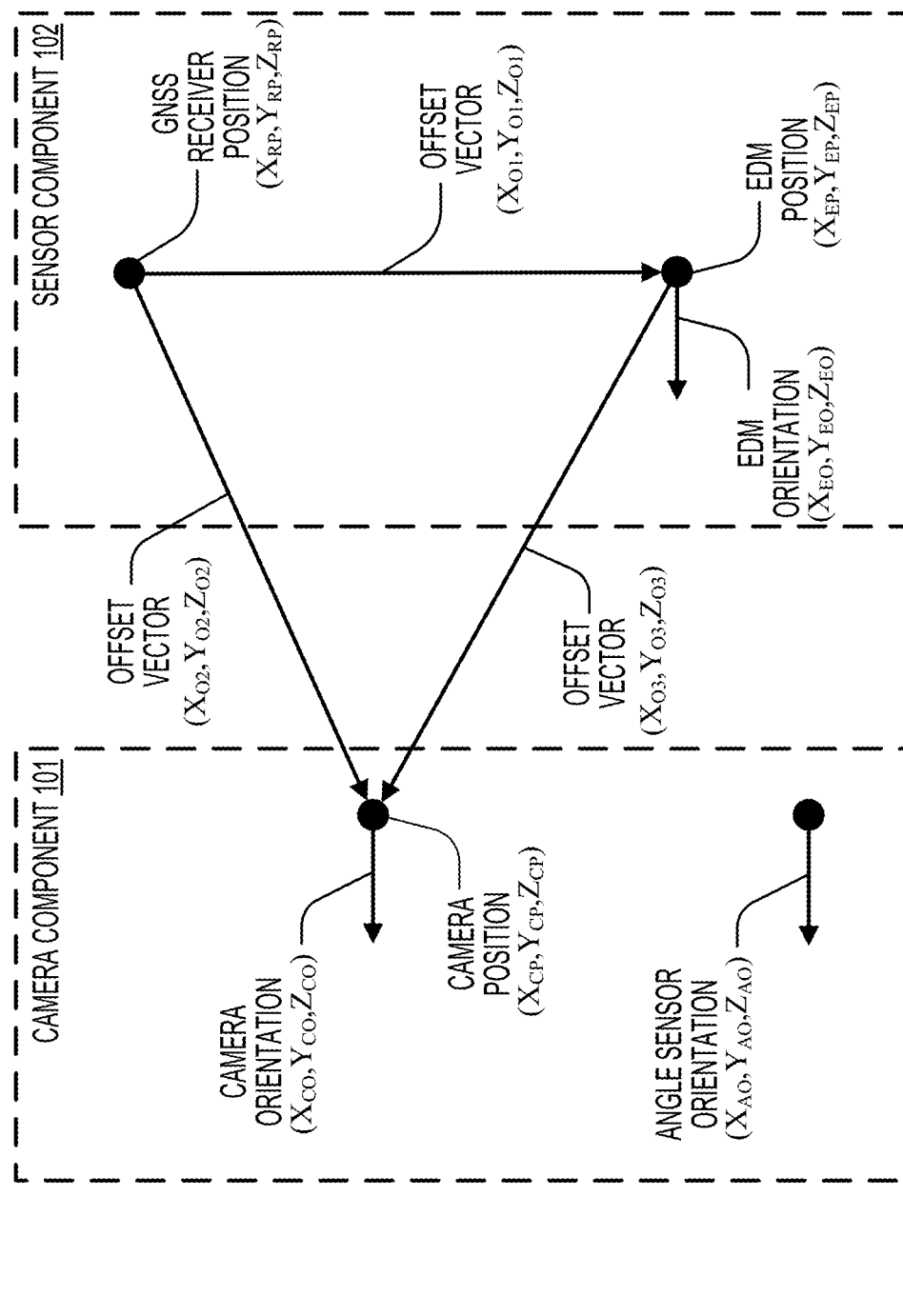
FIG. 4 illustrates a diagram showing position and orientation relationships of an AR device in which a camera component is attached to a sensor component, according to some embodiments of the present invention.

FIG. 4 illustrates a diagram showing position and orientation relationships of AR device 100 in which camera component 101 is attached to sensor component 102, according to some embodiments of the present invention. In the illustrated embodiment, a second offset vector $(X_{O2},Y_{O2},Z_{O2})$ is defined as the vector extending between the position of GNSS receiver 110 $(X_{RP},Y_{RP},Z_{RP})$ and the position of camera 116 $(X_{CP},Y_{CP},Z_{CP})$, and a third offset vector $(X_{O3},Y_{O3},Z_{O3})$ is defined as the vector extending between the position of EDM device 146 $(X_{EP},Y_{EP},Z_{EP})$ and the position of camera 116 $(X_{CP},Y_{CP},Z_{CP})$. In some embodiments, knowledge of the second offset vector $(X_{O2},Y_{O2},Z_{O2})$ and either the position of GNSS receiver 110 $(X_{RP},Y_{RP},Z_{RP})$ or the position of camera 116 $(X_{CP},Y_{CP},Z_{CP})$ can be used to find the unknown position. In some embodiments, the relationship between (e.g., angle formed by) the second offset vector $(X_{O2},Y_{O2},Z_{O2})$ and the orientation of camera 116 $(X_{CO},Y_{CO},Z_{CO})$ is known and may be utilized in a way such that knowledge of the orientation of camera 116 $(X_{CO},Y_{CO},Z_{CO})$ and either the position of GNSS receiver 110 $(X_{RP},Y_{RP},Z_{RP})$ or the position of camera 116 $(X_{CP},Y_{CP},Z_{CP})$ can be used to find the unknown position. In some embodiments, knowledge of the third offset vector $(X_{O3},Y_{O3},Z_{O3})$ and either the position of EDM device 146 $(X_{EP},Y_{EP},Z_{EP})$ or the position of camera 116 $(X_{CP},Y_{CP},Z_{CP})$ can be used to find the unknown position. In some embodiments, the relationship between (e.g., angle formed by) the third offset vector $(X_{O3},Y_{O3},Z_{O3})$ and the orientation of camera 116 $(X_{CO},Y_{CO},Z_{CO})$ is known and may be utilized in a way such that knowledge of the orientation of camera 116 $(X_{CO},Y_{CO},Z_{CO})$ and either the position of EDM device 146 $(X_{EP},Y_{EP},Z_{EP})$ or the position of camera 116 $(X_{CP},Y_{CP},Z_{CP})$ can be used to find the unknown position.

Each of the offset vectors has a fixed length when camera component 101 is attached to sensor component 102. Because each of the offset vectors are connected to the other two offset vectors, knowledge of any two of the offset vectors can be used to find the unknown offset vector.

Figure 5:
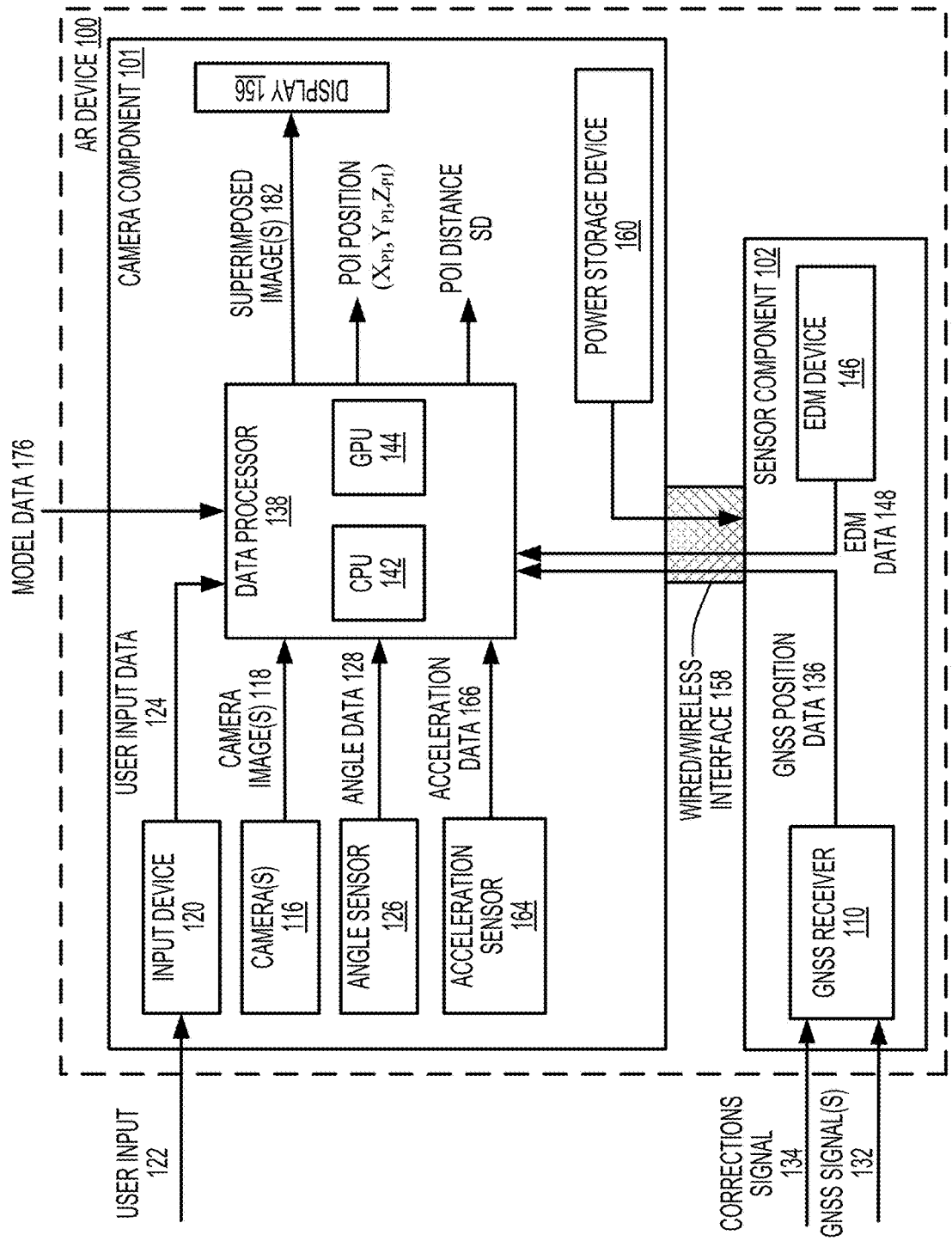
FIG. 5 illustrates a block diagram of an AR device in which a camera component is attached to a sensor component, according to some embodiments of the present invention.

FIG. 5 illustrates a block diagram of AR device 100 in which camera component 101 is attached to sensor component 102, according to some embodiments of the present invention. Data is communicated from sensor component 102 to camera component 101 through a wired/wireless interface 158. In some embodiments, interface 158 comprises a universal serial bus (USB) through which power and data can be transferred between the components. For example, camera component 101 may include a power storage device 160 that may transfer power to sensor component 102 via interface 158.

In some embodiments, camera component 101 includes an input device 120 for receiving user input 122 and generating user input data 124 based on the user input. Input device 120 may be a button, a switch, a microphone, a touchscreen (e.g., integrated into display 156), among other possibilities. User input 122 may indicate a point of interest (by, for example, moving a cursor being displayed on display 156 so as to indicate the point of interest) for which a GNSS coordinate is to be calculated. In some embodiments, camera component 101 includes a camera 116 for generating one or more camera images 118. Camera images 118 may include a single image, multiple images, a stream of images (e.g., a video), among other possibilities.

In some embodiments, camera component 101 includes an angle sensor 126 for generating angle data 128 corresponding to camera component 101 (and AR device 100). Angle sensor 126 may be any electronic device capable of detecting angular rate and/or angular position. In some embodiments, angle sensor 126 may directly detect angular rate and may integrate to obtain angular position, or alternatively angle sensor 126 may directly measure angular position and may determine a change in angular position (e.g., determine the derivative) to obtain angular rate. In many instances, angle sensor 126 is used to determine a yaw angle, a pitch angle, and/or a roll angle corresponding to camera component 101 (and AR device 100). Accordingly, in various embodiments angle data 128 may include one or more of a yaw angle, a pitch angle, a roll angle, an orientation, or raw data from which one or more angles and orientations may be calculated. Angle sensor 126 may include one or more gyroscopes and may be included as part of an inertial measurement unit (IMU).

In some embodiments, camera component 101 includes an acceleration sensor 164 for generating acceleration data 166 corresponding to camera component 101 (and AR device 100). Acceleration sensor 164 may be any electronic device capable of detecting linear acceleration. In some embodiments, acceleration sensor 164 may directly measure linear velocity and may determine a change in linear velocity (e.g., determine the derivative) to obtain linear acceleration. Alternatively or additionally, acceleration sensor 164 may directly measure linear position and may determine a change in linear position (e.g., determine the derivative) to obtain linear velocity, from which linear acceleration can be calculated. Acceleration data 166 may include one or more acceleration values or raw data from which one or more acceleration values may be calculated. Acceleration sensor 164 may include one or more accelerometers and may be included as part of an IMU.

In some embodiments, camera component 101 includes a data processor 138 that includes a central processing unit (CPU) 142 and/or a graphics processing unit (GPU) 144 for processing data and generating various outputs based on the processed data. For example, data processor 138 may generate superimposed image 182 that is displayed by display 156, a position of a point of interest $(X_{PI}, Y_{PI}, Z_{PI})$, and/or a distance (e.g., a slope distance SD) between AR device 100 and the point of interest. Data processor 138 may receive data from various sources, including but not limited to, model data 176, user input data 124 generated by input device 120, camera image 118 generated by camera 116, angle data 128 generated by angle sensor 126, acceleration data 166 generated by acceleration sensor 164, GNSS position data 136 generated by GNSS receiver 110, and EDM data 148 generated by EDM device 146. Data processor 138 may use multiple types of data to make position and orientation calculations. For example, data processor 138 may analyze one or more camera images 118 to supplement orientation calculations based on angle data 128 or position calculations based on GNSS position data 136. As another example, data processor 138 may use acceleration data 166 to supplement position calculations based on GNSS position data 136.

In some embodiments, GNSS receiver 110 receives one or more GNSS signals 132 from one or more GNSS satellites to generate position estimates. In some embodiments, GNSS receiver 110 also receives a corrections signal 134 (using a same or different antenna) to apply corrections to the position estimates, allowing the position estimates to improve from meter accuracy to centimeter accuracy in many cases. Alternatively or additionally, corrections signal 134 may be received by camera component 101 (e.g., via a wireless interface), and data processor 138 may apply the corrections to the position estimates after receiving GNSS position data 136 from GNSS receiver 110.

Figure 6:
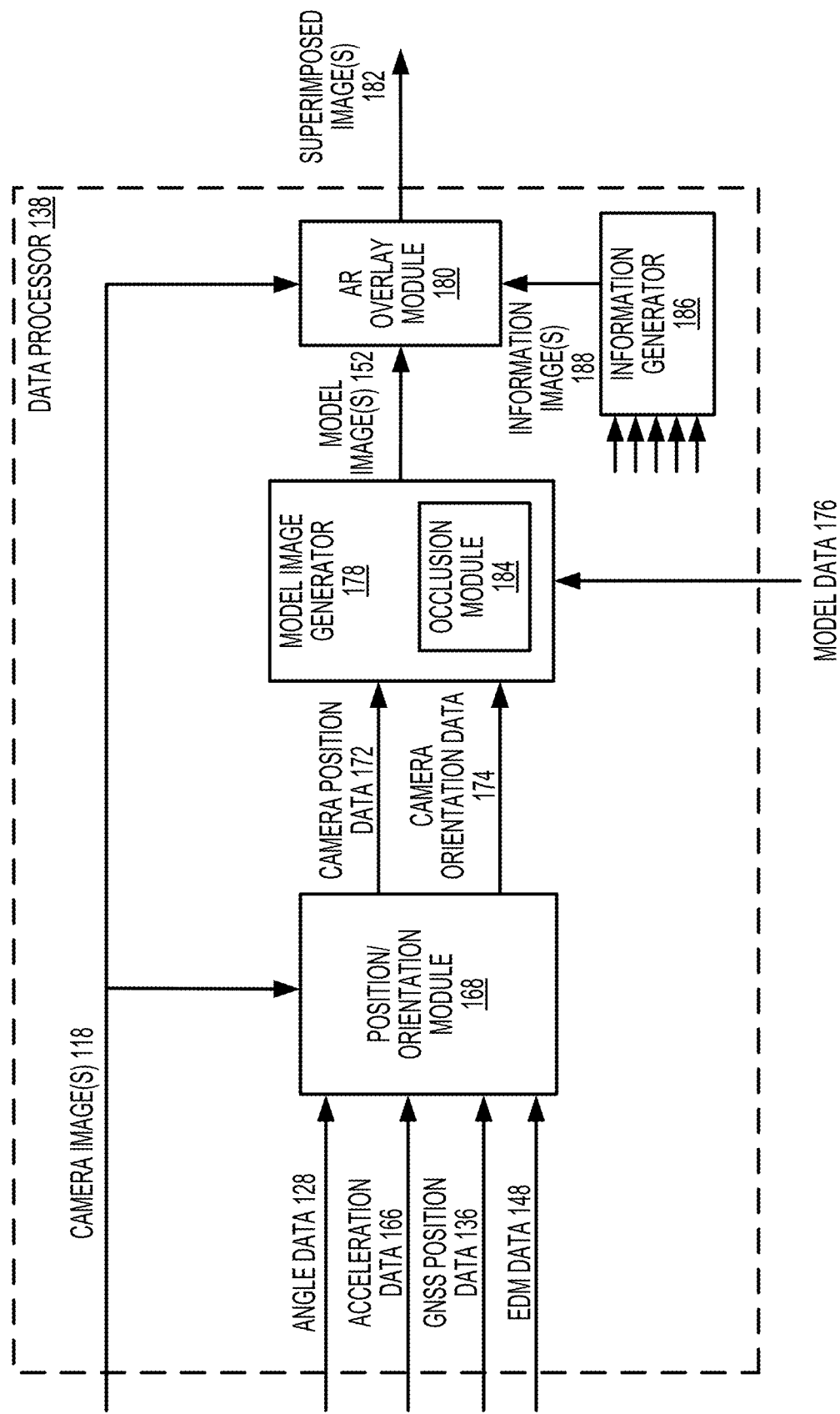
FIG. 6 illustrates a block diagram of a data processor, according to some embodiments of the present invention.

FIG. 6 illustrates a block diagram of data processor 138, according to some embodiments of the present invention. Each of the modules and generators illustrated in FIG. 6 may be implemented in hardware and/or software. In some embodiments, data processor 138 includes a position/orientation module 168 for determining camera position data 172 and camera orientation data 174. Camera position data 172 may include a 3D coordinate (e.g., three real numbers) representing the relative position of camera 116 at a particular time. Similarly, camera orientation data 174 may include a 3D vector (e.g., three real numbers) representing the orientation of camera 116 at a particular time. Position/orientation module 168 may be configured to output positions and orientations periodically, at non-regular intervals, or upon receiving updated data from one or more of angle data 128, acceleration data 166, GNSS position data 136, EDM data 148, and camera image 118.

In some embodiments, position/orientation module 168 determines/updates camera position data 172 and camera orientation data 174 based on GNSS position data 136 each time new GNSS position data 136 is received (referred to as a GNSS point). In some embodiments, position/orientation module 168 determines/updates camera position data 172 and camera orientation data 174 based on angle data 128, acceleration data 166, or camera image 118 each time new angle data 128, acceleration data 166, or camera image 118 is received (referred to as an AR point). In some instances, performance of AR device 100 is improved when AR points and GNSS points are conjunctively used to determine camera position data 172. In some instances, this is accomplished by maintaining two separate and independent frames: an AR frame (corresponding to AR points) and a geospatial frame (corresponding to GNSS points). The AR frame represents a camera space which maintains the relationship between different AR points. For example, a first AR point at a first time may be (0, 0, 0) within the AR frame, a second AR point at a second time may be (22.3, −12.6, 0) within the AR frame, and a third AR point at a third time may be (34.0, −22.9, −0.1) within the AR frame. Any operations performed on the AR frame, such as shifting or rotating, causes all points within the AR frame to be similarly affected. For example, shifting the AR frame by (0, 5, 0) would cause the three AR points to become (0, 5, 0), (22.3, −7.6, 0), and (34.0, −17.9, −0.1), respectively.

Similar to the AR frame, the geospatial frame represents a GNSS space which maintains the relationship between different GNSS points (3D positions determined based on GNSS position data 136). For example, a first GNSS point at a first time may be (10, 10, 10) within the geospatial frame, a second GNSS point at a second time may be (32.3, −2.6, 10) within the geospatial frame, and a third GNSS point at a third time may be (44.0, −12.9, 9.9) within the geospatial frame. Any operations performed on the geospatial frame, such as shifting or rotating, causes all points within the geospatial frame to be similarly affected. For example, shifting the geospatial frame by (0, 5, 0) would cause the three GNSS points to become (10, 15, 10), (32.3, 2.4, 10), and (44.0, −7.9, 9.9), respectively.

Figure 10:
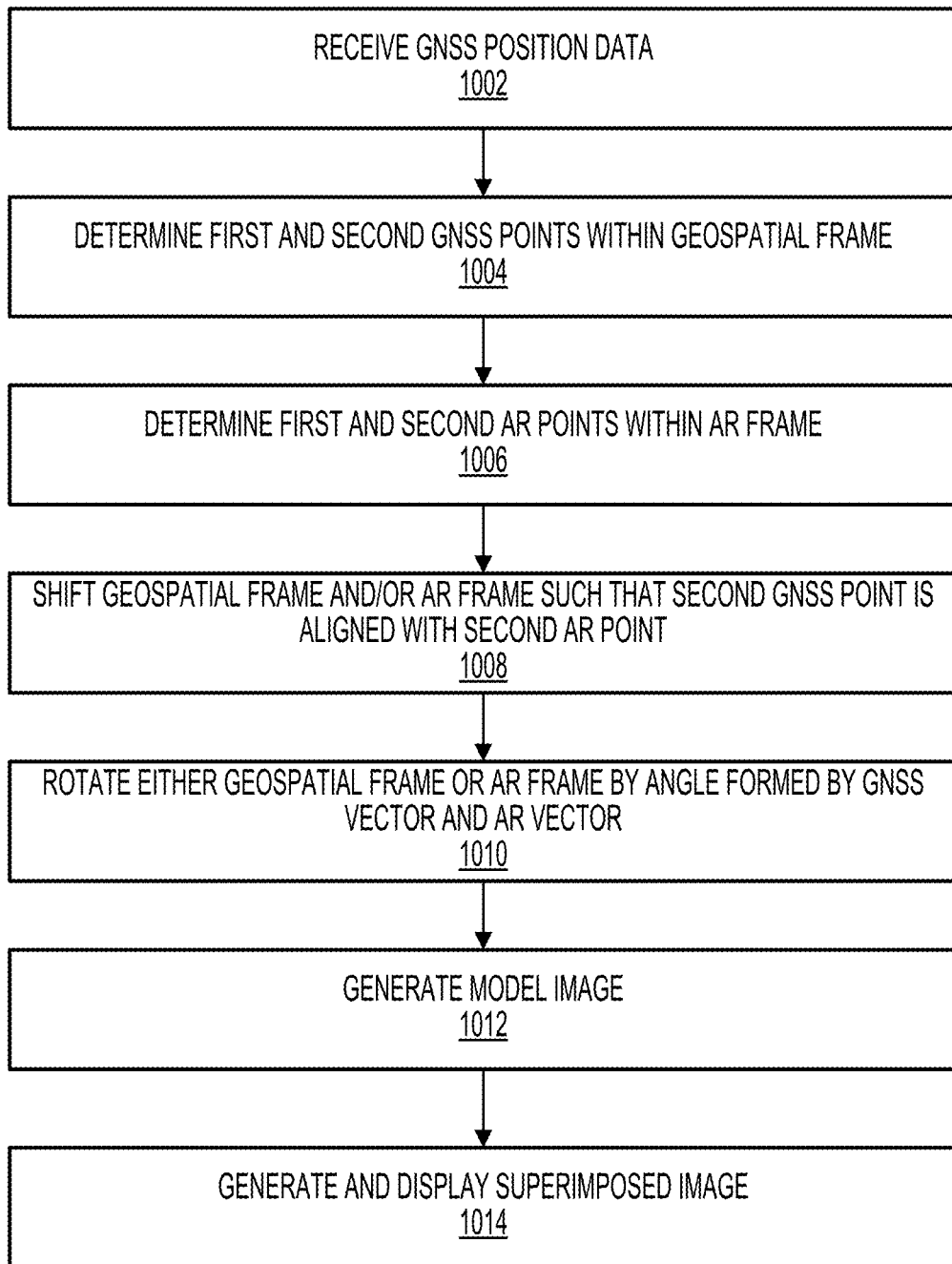
FIG. 10 illustrates a method for synchronizing an AR frame with a geospatial frame, according to some embodiments of the present invention.

In an ideal scenario, AR points and GNSS points would be generated by position/orientation module 168 simultaneously and would be identical to each other. However, due to the differences between the two technologies, this is generally not the case. For example, GNSS position data 136 is generally received less frequently than camera images 118, is generally more accurate and stable than image-based pose data (e.g., centimeter accuracy), and does not suffer from initialization issues that are problematic image-based pose data, e.g., the establishment of a new temporary local reference frame with the first AR point is generally set to (0, 0, 0). Furthermore, because of the initialization issues associated with image-based pose data (and also due to its inferior accuracy and drift over time and distance), the AR frame and the geospatial frame do not necessarily correspond to each other and therefore must be reconciled. To resolve these issues, among others, position/orientation module 168 may perform a series of steps in order to determine camera position data 172 and camera orientation data 174 that incorporate both image-based pose data and GNSS position data 136. These steps are illustrated in FIG. 10 by method 1000 and are further detailed in reference to FIGS. 11A and 11B.

In some embodiments, AR device 100 includes a model image generator 178 for generating a model image 152. In some instances, model image generator 178 receives model data 176 via a wired or wireless connection which defines a model (e.g., a building, a structure, a tree, underground utilities, etc.). Model data 176 may include 3D coordinates corresponding to the model as well as other information for generating model image 152, such as colors, textures, lighting, etc. In some embodiments, model image generator 178 generates model image 152 based on each of camera position data 172, camera orientation data 174, and model data 176. For example, as the camera position and/or orientation changes, model image 152 may also be modified to accurately reflect the difference in position and/or orientation (e.g., as the position of the camera gets further away from the position of the model, model image 152 may become smaller). In some embodiments, model image 152 is held static until a change in one or more of camera position data 172, camera orientation data 174, and model data 176 is detected by model image generator 178. In some embodiments, portions of model image 152 may be occluded by an occlusion module 184 when real world objects are positioned in front of the 3D model. In some embodiments, occlusion module 184 may occlude camera image 118 when the 3D model is positioned in front of real world objects.

In some embodiments, AR device 100 includes an AR overlay module 180 for generating a superimposed image 182 by superimposing model image 152 onto camera image 118 (or by superimposing camera image 118 onto model image 152). In some instances, superimposed image 182 is output to display 156 which displays superimposed image 182 for viewing by a user. In some instances, a user may select whether or not model image 152 is visible on display 156 or whether any transparency is applied to model image 152 or camera image 118. In some embodiments, AR device 100 includes an information generator 186 for generating information that may be added to superimposed image 182. For example, information generator 186 may generate an information image 188 that may visually display the position of AR device 100, the orientation of AR device 100, the position of the point of interest $(X_{PI}, Y_{PI}, Z_{PI})$, a distance to the point of interest SD, among other possibilities. Accordingly, superimposed image 182 may be generated to include portions of camera image 118, model image 152, and/or information image 188.

Figure 7:
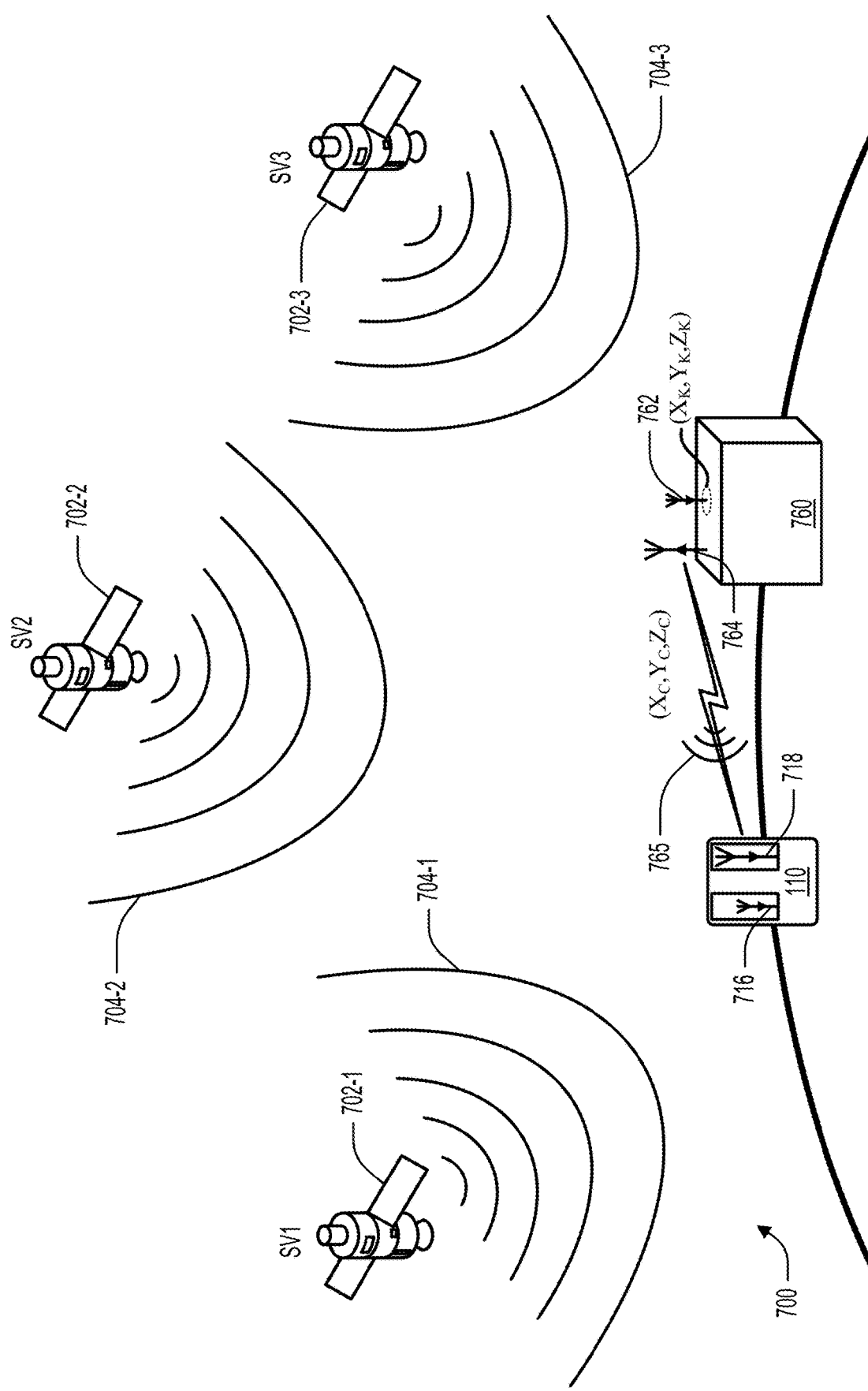
FIG. 7 illustrates an example of a GNSS receiver and a base station operating within a GNSS, according to some embodiments of the present invention.

FIG. 7 illustrates an example of GNSS receiver 110 and a base station 760 operating within a GNSS 700, according to some embodiments of the present invention. GNSS 700 includes one or more GNSS satellites 702, i.e., space vehicles (SV), in orbit above GNSS receiver 110 and base station 760. GNSS satellites 702 may continuously, periodically, or intermittently broadcast wireless signals 704 containing PRN codes modulated onto carrier frequencies (e.g., L1 and/or L2 carrier frequencies). Wireless signals 704 corresponding to different GNSS satellites 702 may include different PRN codes that identify a particular GNSS satellite 702 such that receivers may associate different distance estimates (i.e., pseudoranges) to different GNSS satellites 702. For example, GNSS satellite 702-1 may broadcast wireless signals 704-1 which contain a different PRN code than the PRN code contained in wireless signals 704-2 broadcasted by GNSS satellite 702-2. Similarly, GNSS satellite 702-3 may broadcast wireless signals 704-3 which contain a different PRN code than the PRN codes contained in wireless signals 704-1 and 704-2 broadcasted by GNSS satellites 702-1 and 702-2, respectively. One or more of wireless signals 704 may be received by a GNSS antenna 716 of GNSS receiver 110. GNSS antenna 716 may be a patch antenna, a turnstile antenna, a helical antenna, a parabolic antenna, a phased-array antenna, a resistive plane antenna, a choke ring antenna, a radome antenna, among other possibilities.

Each of GNSS satellites 702 may belong to one or more of a variety of system types, such as Global Positioning System (GPS), Satellite-based Augmentation System (SBAS), Galileo, Global Navigation Satellite System (GLONASS), and BeiDou, and may transmit wireless signals having one or more of a variety of signal types (e.g., GPS L1 C/A, GPS L2C, Galileo E1, Galileo E5A, etc.). For example, GNSS satellite 702-1 may be a GPS satellite and may transmit wireless signals having a GPS L1 C/A signal type (i.e., wireless signals having frequencies within the GPS L1 band and having been modulated using C/A code). GNSS satellite 702-1 may additionally or alternatively transmit wireless signals having a GPS L2C signal type (i.e., wireless signals having frequencies within the GPS L2 band and having been modulated using L2 civil codes). In some embodiments, GNSS satellite 702-1 may additionally be a Galileo satellite and may transmit wireless signals having a Galileo signal type (e.g., Galileo E1). Accordingly, a single satellite may include the ability to transmit wireless signals of a variety of signal types.

Merely by way of example, GNSS receiver 110 may use the three distance estimates between itself and GNSS satellites 702-1, 702-2, and 702-3 to generate a position estimate through a process called trilateration. In some instances, trilateration involves generating three spheres having center locations corresponding to the locations of GNSS satellites 702 and radii corresponding to the distance estimates (i.e., pseudoranges). The three spheres intersect at two locations, one of which is more plausible than the other given the position of the earth. The less plausible location is discarded and the more plausible location is used as the position estimate for GNSS receiver 710. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

In some embodiments, base station 760 may include a GNSS antenna 762 positioned at a known position (e.g., $X_K, Y_K, Z_K$). GNSS antenna 762 may be similar to GNSS antenna 716 and may be configured to receive one or more of wireless signals 704. For example, GNSS antenna 762 may be a patch antenna, a turnstile antenna, a helical antenna, a parabolic antenna, a phased-array antenna, a resistive plane antenna, a choke ring antenna, a radome antenna, etc., and may have a similar orientation and/or surroundings to that of GNSS antenna 716. Position estimates made using GNSS antenna 762 are compared to the known position and correction data (e.g., $X_C, Y_C, Z_C$) may be generated based on the comparison. The correction data may include a 3D offset amount and/or any one of various types of raw or processed satellite data that may be used to improve the accuracy of a position estimate. A corrections signal 765 containing the correction data may then be transmitted from base station 760 to GNSS receiver 110 using a corrections antenna 764 at base station 760 and a corrections antenna 718 at GNSS receiver 110. In some embodiments, corrections signal 765 is transmitted over a set of wireless frequencies outside the GNSS frequencies (e.g., lower than the GNSS frequencies). In some embodiments, corrections antenna 764 may be used for transmission only and corrections antenna 718 may be used for reception only, although in some embodiments additional handshaking between GNSS receiver 110 and base station 760 may occur.

Figure 8:
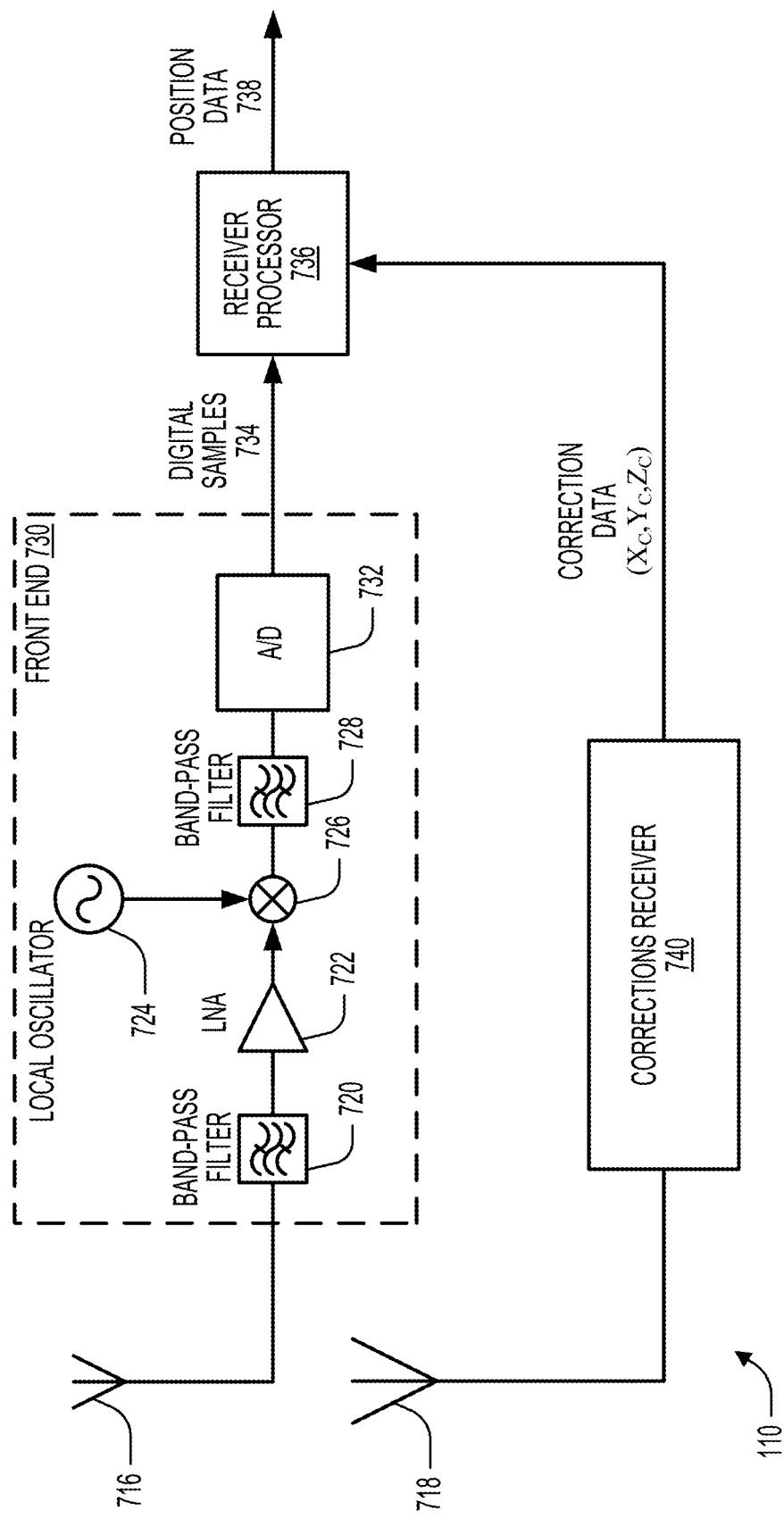
FIG. 8 illustrates a block diagram of a GNSS receiver, according to some embodiments of the present invention.

FIG. 8 illustrates a block diagram of GNSS receiver 110, according to some embodiments of the present invention. GNSS receiver 110 includes antenna 716 for receiving wireless signals 704 and sending/routing wireless signals 704 to an RF front end 730. RF front ends are well known in the art, and in some instances include a band-pass filter 720 for initially filtering out undesirable frequency components outside the frequencies of interest, a low-noise amplifier (LNA) 722 for amplifying the received signal, a local oscillator 724 and a mixer 726 for down converting the received signal from RF to intermediate frequencies (IF), a band-pass filter 728 for removing frequency components outside IF, and an analog-to-digital (A/D) converter 732 for sampling the received signal to generate digital samples 734.

In some instances, RF front end 730 includes additional or fewer components than that shown in FIG. 8. For example, RF front end 730 may include a second local oscillator (90 degrees out of phase with respect to the first), a second mixer, a second band-pass filter, and a second A/D converter for generating digital samples corresponding to the quadrature component of wireless signals 704. Digital samples corresponding to the in-phase component of wireless signals 704 and digital samples corresponding to the quadrature component of wireless signals 704 may both be sent to a correlator. In some embodiments, digital samples corresponding to both in-phase and quadrature components may be included in digital samples 734.

Other components within RF front end 730 may include a phase-locked loop (PLL) for synchronizing the phase of local oscillator 724 with the phase of the received signal, and a phase shifter for generating a second mixing signal using local oscillator 724 that is 90 degrees out of phase with local oscillator 724. In some embodiments, RF front end 730 does not include band-pass filter 720 and LNA 722. In some embodiments, A/D converter 732 is coupled directly to antenna 716 and samples the RF signal directly without down-conversion to IF. In some embodiments, RF front end 730 only includes band-pass filter 720 and A/D converter 732. Other possible configurations of RF front end 730 are possible.

Digital samples 734 generated by RF front end 730 are sent to a correlator and/or a receiver processor 736. A correlator may perform one or more correlations on digital samples 734 using local codes. In some embodiments, one or more operations performed by the correlator may alternatively be performed by receiver processor 736. In some embodiments, the correlator is a specific piece of hardware, such as an application-specific integrated circuit (ASIC) or a field-programmable gate array (FPGA). In some embodiments, operations performed by the correlator are performed entirely in software using digital signal processing (DSP) techniques.

Based on multiple distance estimates corresponding to multiple GNSS satellites 702, as well as correction data generated by a corrections receiver 740, GNSS receiver 110 (i.e., receiver processor 736) generates and outputs GNSS position data 738 comprising a plurality of GNSS points.

Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. Position data 738 may be outputted to be displayed to a user, transmitted to a separate device (e.g., computer, smartphone, server, etc.) via a wired or wireless connection, or further processed, among other possibilities.

FIGS. 9A-9D illustrate a trilateration technique performed by GNSS receiver 110 to generate a position estimate, according to some embodiments of the present invention. FIG. 9A shows a first scenario in which GNSS receiver 110 receives GNSS signals 704 from a first satellite and generates a distance estimate (e.g., 20,200 km) for that satellite. This informs GNSS receiver 110 that it is located somewhere on the surface of a sphere with a radius of 20,200 km, centered on the first satellite. FIG. 9B shows a second scenario in which GNSS receiver 110 receives GNSS signals 704 from a second satellite and generates a distance estimate (e.g., 23,000 km) for the additional satellite. This informs GNSS receiver 110 that it is also located somewhere on the surface of a sphere with a radius of 23,000 km, centered on the second satellite. This limits the possible locations to somewhere on the circle where the first sphere and second sphere intersect.

FIG. 9C shows a third scenario in which GNSS receiver 110 receives GNSS signals 704 from a third satellite and generates a distance estimate (e.g., 25,800 km) for the additional satellite. This informs GNSS receiver 110 that it is also located somewhere on the surface of a sphere with a radius of 25,800 km, centered on the third satellite. This limits the possible locations to two points where the first sphere, the second sphere, and the third sphere intersect. FIG. 9D shows a fourth scenario in which GNSS receiver 110 receives GNSS signals 704 from a fourth satellite. The fourth satellite can be used to resolve which of the two points is the correct one (by generating a fourth sphere) and/or to synchronize the receiver's clock with the satellites' time.

FIG. 10 illustrates a method 1000 for synchronizing an AR frame with a geospatial frame, according to some embodiments of the present invention. Steps of method 1000 may be performed in any order, and not all steps of method 1000 need be performed. Method 1000 may be performed continuously, periodically, or intermittently during operation of AR device 100, among other possibilities.

At step 1002, GNSS position data 136 is received by position/orientation module 168. At step 1004, position/orientation module 168 determines, based on GNSS position data 136, a first GNSS point within a geospatial frame at a first GNSS time within a first time interval and a second GNSS point within the geospatial frame at a second GNSS time within a second time interval. In some embodiments, the first GNSS point and the second GNSS point form a GNSS vector.

At step 1006, position/orientation module 168 determines, based on one or more of camera image 118, angle data 128, and acceleration data 166, a first AR point within an AR frame at a first AR time within the first time interval and a second AR point within the AR frame at a second AR time within the second time interval. In some embodiments, the first AR point and the second AR point form an AR vector. In one particular example, the first time interval may be from 27.3 to 30.1 seconds, the first GNSS time may be 28.6 seconds, and the first AR time may be 27.8 seconds. Continuing with the above example, the second time interval may be 45.8 to 46.1 seconds, the second GNSS time may be 45.8 seconds, and the second AR time may be 46.0 seconds. In various embodiments, the first time interval may have a length of 10 milliseconds, 100 milliseconds, 1 second, 10 seconds, 1 minute, and the like. Similarly, in various embodiments, the second time interval may have a length of 10 milliseconds, 100 milliseconds, 1 second, 10 seconds, 1 minute, and the like. In some embodiments, the first time interval and the second time interval may not overlap, although in other embodiments they may overlap by an insignificant amount (e.g., 5%, 10% overlap).

At step 1008, position/orientation module 168 shifts the geospatial frame and/or the AR frame such that the second GNSS point is aligned with the second AR point. At step 1010, position/orientation module 168 calculates the angle formed by the GNSS vector and the AR vector and rotates either the geospatial frame to the AR frame or the AR frame to the geospatial frame by the calculated angle, thereby causing the GNSS vector to become aligned with the AR vector. In some embodiments, both the geospatial frame and the AR frame are rotated until the GNSS vector is aligned with the AR vector. For example, if the calculated angle is 45 degrees, the geospatial frame may be rotated by 45 degrees, the AR frame may be rotated by 45 degrees (in the opposite direction), or both frames may be rotated by amounts that sum to 45 degrees (e.g., 22.5 degrees each).

At step 1012, model image generator 178 generates model image 152 based on model data 176, the shift performed in step 1008, the rotation performed in step 1012, camera position data 172, and/or camera orientation data 174. In general, improved performance of AR device 100 may be achieved where the model defined by model data 176 is shifted and rotated along with the geospatial frame but not with the AR frame. For example, in some embodiments where only the geospatial frame is shifted and rotated, the model is shifted and rotated along with the geospatial frame so that it is displayed properly within model image 152. In other embodiments where only the AR frame is shifted and rotated, the model may retain its original coordinates.

At step 1014, AR overlay module 180 generates superimposed image 182 and display 156 displays superimposed image 182. Superimposed image 182 may be generated by superimposing model image 152 onto camera image 118 (or by superimposing camera image 118 onto model image 152).

Figure 11A:
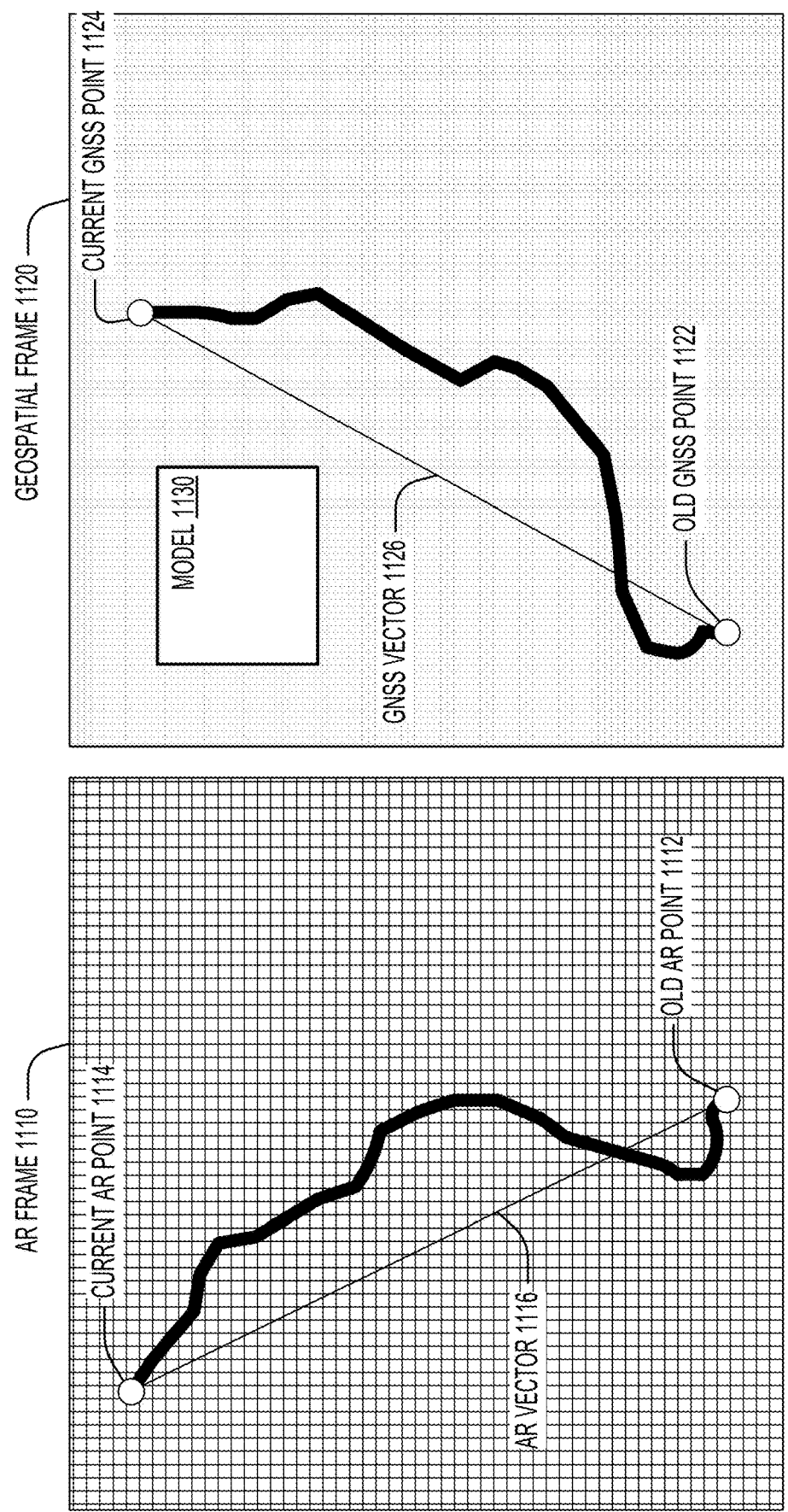
FIGS. 11A and 11B illustrate steps of a method, according to some embodiments of the present invention.
Figure 11B:
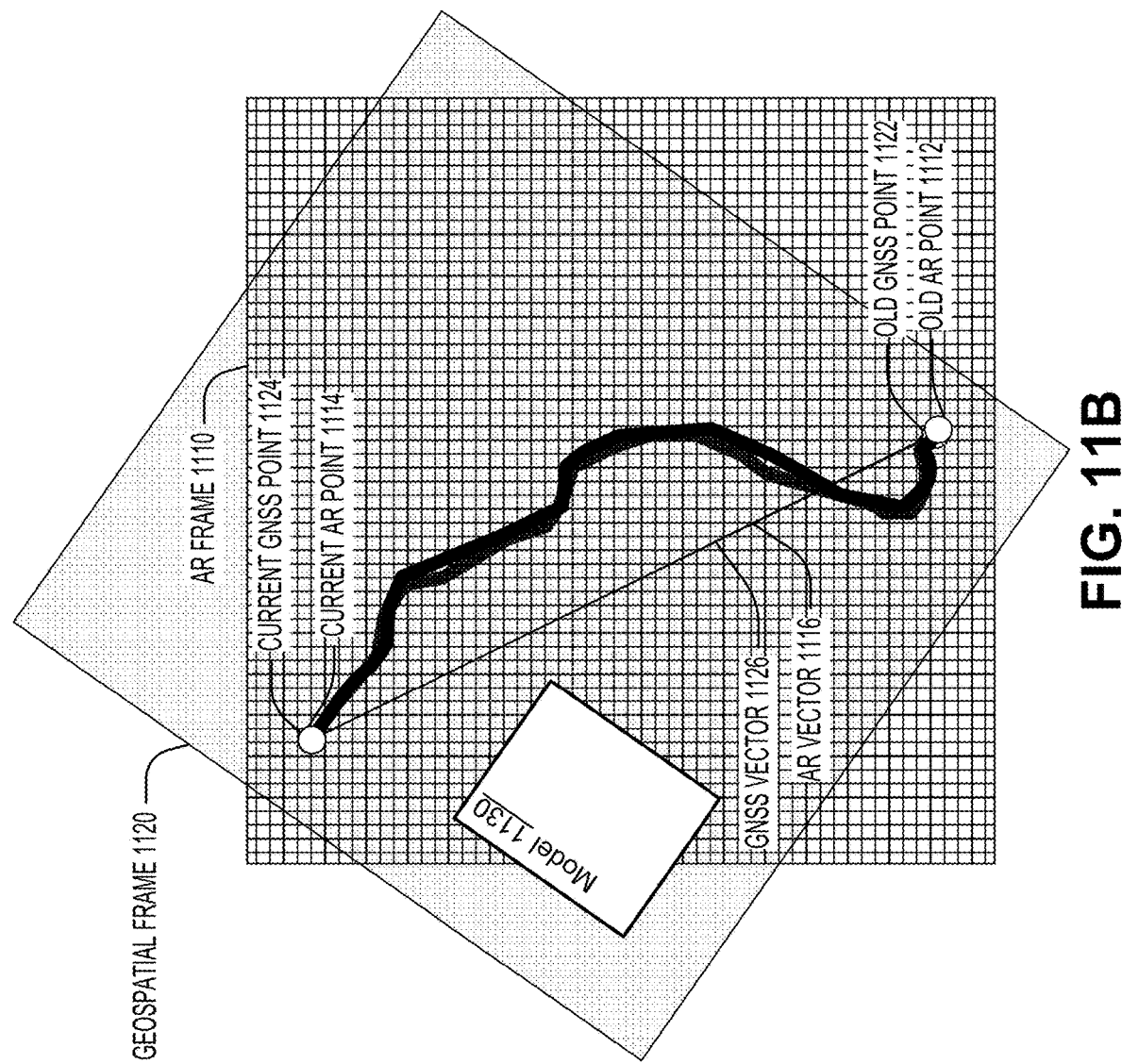

FIGS. 11A and 11B illustrate steps of method 1000, according to some embodiments of the present invention. Referring to FIG. 11A, old GNSS point 1122 within geospatial frame 1120 and old AR point 1112 within AR frame 1110 may be determined at a first time, and current GNSS point 1124 within geospatial frame 1120 and current AR point 1114 within AR frame 1110 may be determined at a second time. Between the first time and the second time, additional points may be determined for both frames (as shown by the two thick solid lines). In some embodiments, the second time may be when an additional GNSS point becomes available after the first time. For example, although AR points may be determined on the milliseconds timescale, GNSS points may only be available every few seconds. GNSS points may be particularly delayed in situations where AR device 100 is being used with limited satellite visibility. For example, where AR device 100 is being used under a tree or in a building, GNSS points may only be available once every few minutes. In some embodiments, a model 1130 as defined by model data 176 may be configured within geospatial frame 1120 as shown in FIG. 11A. Model 1130 may be included within geospatial frame 1120 such that model 1130 may be shifted and/or rotated along with geospatial frame 1120. As described herein, model 1130 may be a virtual representation of any number of structures, e.g., house, building, tree, underground utilities, etc.

Referring to FIG. 11B, one or both of geospatial frame 1120 and AR frame 1110 may be shifted such that current GNSS point 1124 is aligned with current AR point 1114, and either geospatial frame 1120 is rotated to AR frame 1110 or AR frame 1110 is rotated to geospatial frame 1120 by angle 1140, causing GNSS vector 1126 to become aligned with AR vector 1116. Alignment may occur over several dimensions. For example, geospatial frame 1110 may be shifted in each of three dimensions. Upon alignment of current GNSS point 1124 with current AR point 1114, GNSS vector 1126 becomes aligned with AR vector 1116 on at least one end of GNSS vector 1126. Rotation of the frames may occur over several dimensions. For example, geospatial frame 1110 may be rotated in each of three dimensions.

Figure 12:
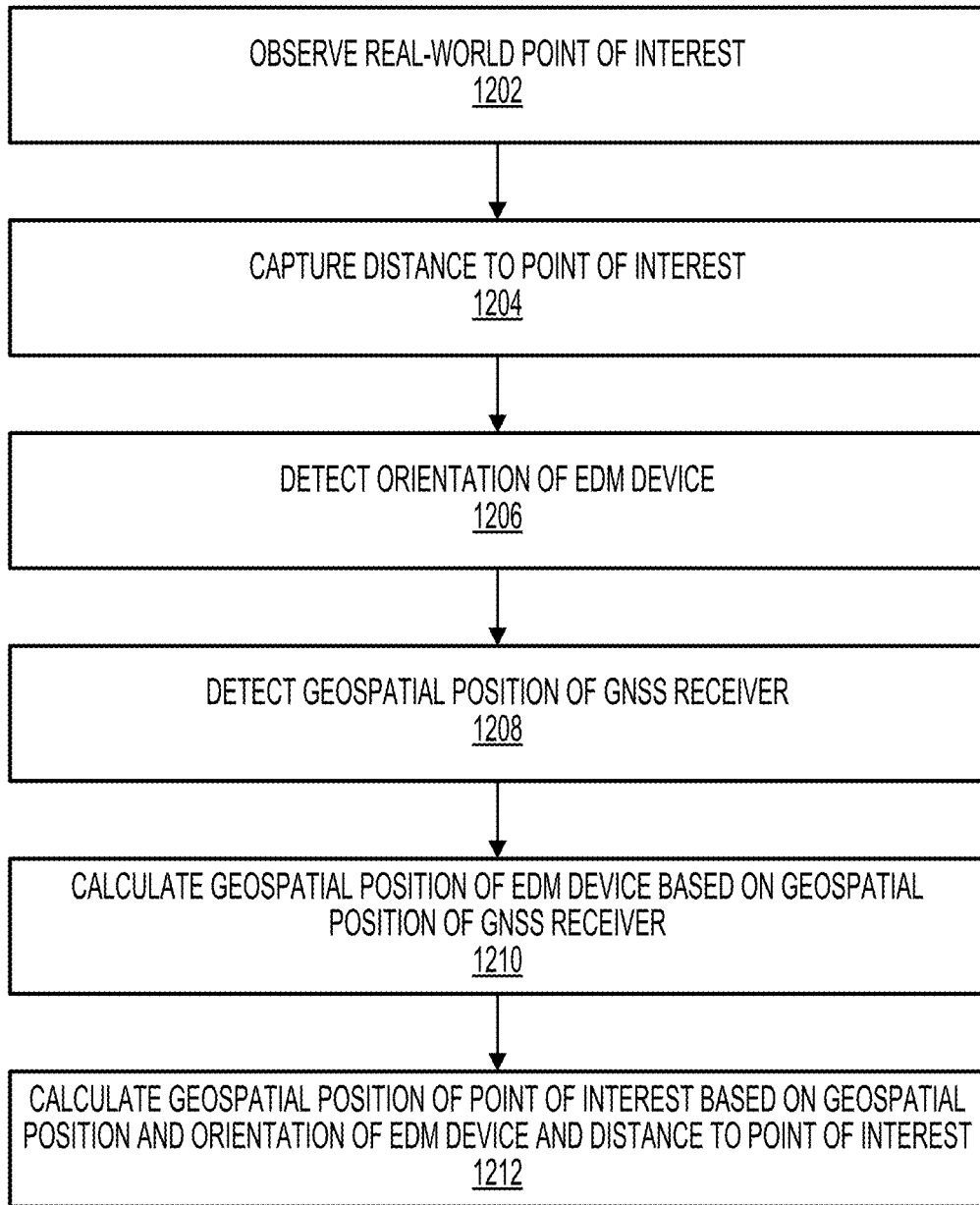
FIG. 12 illustrates a method for calculating a geospatial position of a point of interest, according to some embodiments of the present invention.

FIG. 12 illustrates a method 1200 for calculating a geospatial position of a point of interest, according to some embodiments of the present invention. Steps of method 1200 may be performed in any order, and not all steps of method 1200 need be performed. Method 1200 may be performed in response to AR device 100 receiving user input 122, in response to observing a point of interest, among other possibilities. Method 1200 may be performed by an AR device or a similar portable electronic device.

At step 1202, a point of interest in the real world is observed by camera 116. In some embodiments, the point of interest is contained in camera image 118 and is displayed by display 156. In some embodiments, user input 122 may select the point of interest by, for example, a user touching display 156 at the position where the point of interest is displayed or by moving a cursor being displayed on display 156 so as to indicate the point of interest. In some embodiments, the point of interest is automatically selected by AR device 100. For example, the point of interest may be a maximum or minimum vertical or horizontal point of an object, a center pixel location of display 156, among other possibilities.

At step 1204, a distance to the point of interest is captured by EDM device 146. The distance to the point of interest may be the shortest linear distance (i.e., slope distance) between EDM device 146 and the point of interest.

At step 1206, the orientation of EDM device 146 is detected. In some embodiments, detecting the orientation of EDM device 146 includes detecting an orientation of angle sensor 126 and determining the orientation of EDM device 146 based on the orientation of angle sensor 126. In some embodiments, the orientation of EDM device 146 and the orientation of angle sensor 126 are related by a known relationship, such as a component attachment angle (e.g., 1 degree, 2 degrees, 5 degrees, 10 degrees, etc.). The known relationship may be determined based on how camera component 101 attaches to sensor component 102. For example, upon manufacture of one or both of camera component 101 and sensor component 102, the components may be attached and the component attachment angle may be determined by calibrating the attached components. Over the course of usage of AR device 100, the components may be recalibrated to ensure the component attachment angle remains accurate. In some embodiments, the orientation of EDM device 146 may include one or more horizontal angles (angles with respect to horizontal reference lines) and a vertical angle (angle with respect to a vertical reference line).

At step 1208, the geospatial position of GNSS receiver 110 is detected. In some embodiments, GNSS receiver 110 receives GNSS signal 132 from one or more GNSS satellites (and optionally corrections signal 134) and generates GNSS position data 136 based on GNSS signal 132. GNSS position data 136 is received by data processor 138 which determines, based on GNSS position data 136, a geospatial position of GNSS receiver 110. In some embodiments, position/orientation module 168 determines the geospatial position.

At step 1210, the geospatial position of EDM device 146 is calculated based on the geospatial position of GNSS receiver 110. In some embodiments, calculating the geospatial position of EDM device 146 includes calculating an offset vector extending between the geospatial position of GNSS receiver 110 and the geospatial position of EDM device 146 based on a known relationship between the orientation of EDM device 146 and the offset vector. The known relationship may be an offset angle (e.g., 1 degree, 2 degrees, 5 degrees, 10 degrees, etc.). The magnitude (e.g., length) of the offset vector may be constant and may be determined upon manufacture of sensor component 102. The geospatial position of EDM device 146 may calculated by modifying the geospatial position of GNSS receiver 110 with the offset vector. For example, the geospatial position of EDM device 146 may be calculated by summing the geospatial position of GNSS receiver 110 with the offset vector or by subtracting the offset vector from the geospatial position of GNSS receiver 110 (depending on the method of defining the orientation of the offset vector).

At step 1212, the geospatial position of the point of interest is calculated based on the geospatial position of EDM device 146, the orientation of EDM device 146, and the distance to the point of interest. In some embodiments, calculating the geospatial position of the point of interest includes calculating one or more horizontal distances (e.g., a delta easting, a delta northing, and/or a combination thereof) between the geospatial position of EDM device 146 and the geospatial position of the point of interest based on the horizontal angle, the vertical angle, and/or the distance to the point of interest (as described in reference to FIG. 13A). In some embodiments, calculating the geospatial position of the point of interest includes calculating a vertical distance (e.g., a delta vertical) between the geospatial position of EDM device 146 and the geospatial position of the point of interest based on the vertical angle and the distance to the point of interest (as described in reference to FIG. 13B). In some embodiments, calculating the geospatial position of the point of interest includes modifying the geospatial position of EDM device 146 with the one or more horizontal distances and the vertical distance.

Figure 13A:
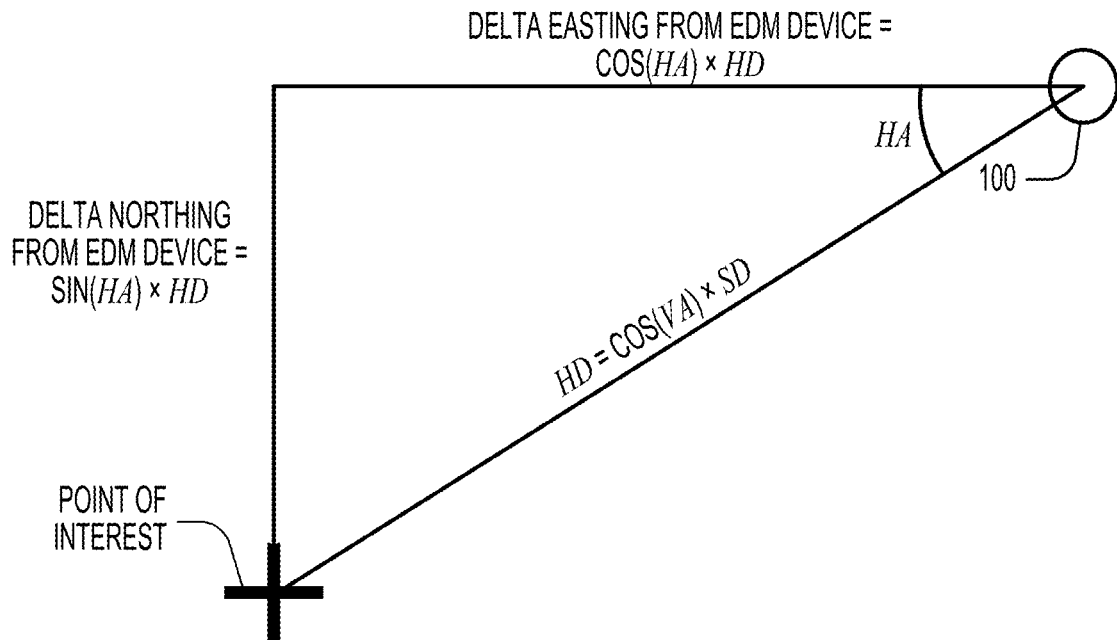
FIGS. 13A and 13B illustrate a top view and a side view of an example implementation of a step of method for calculating a geospatial position of a point of interest, respectively, according to some embodiments of the present invention.
Figure 13B:
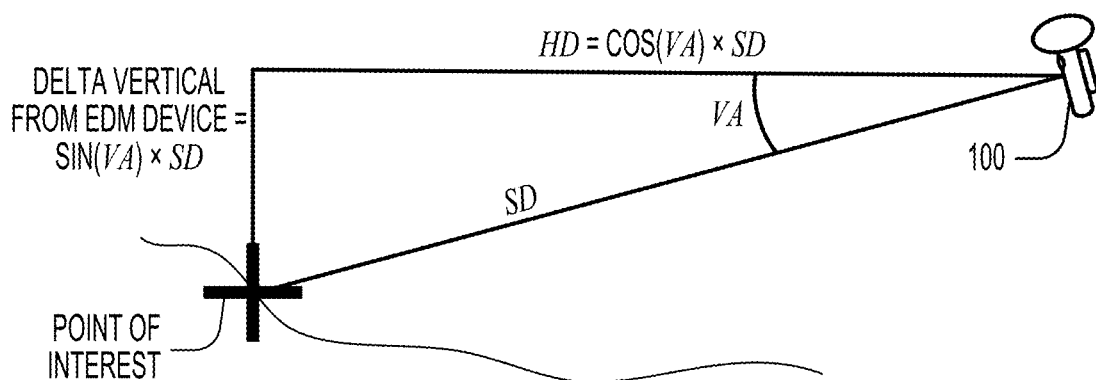

FIGS. 13A and 13B illustrate a top view and a side view of an example implementation of step 1212 of method 1200, respectively, according to some embodiments of the present invention. In reference to FIG. 13A, the detected orientation of EDM device 146 is represented by a horizontal angle HA and a vertical angle VA. The distance between the geospatial position of EDM device 146 and the geospatial position of the point of interest is represented by the slope distance SD. A horizontal distance HD is calculated based on the slope distance SD and the vertical angle VA as follows: HD=cos(VA)×SD. A delta easting is calculated based on the horizontal angle HA and the horizontal distance HD as follows: delta easting=cos(HA)×HD. A delta northing is calculated based on the horizontal angle HA and the horizontal distance HD as follows: delta northing=sin(HA)×HD. In reference to FIG. 13B, a delta vertical is calculated based on the vertical angle VA and the slope distance SD as follows: delta vertical=sin(VA)×SD.

Figure 14:
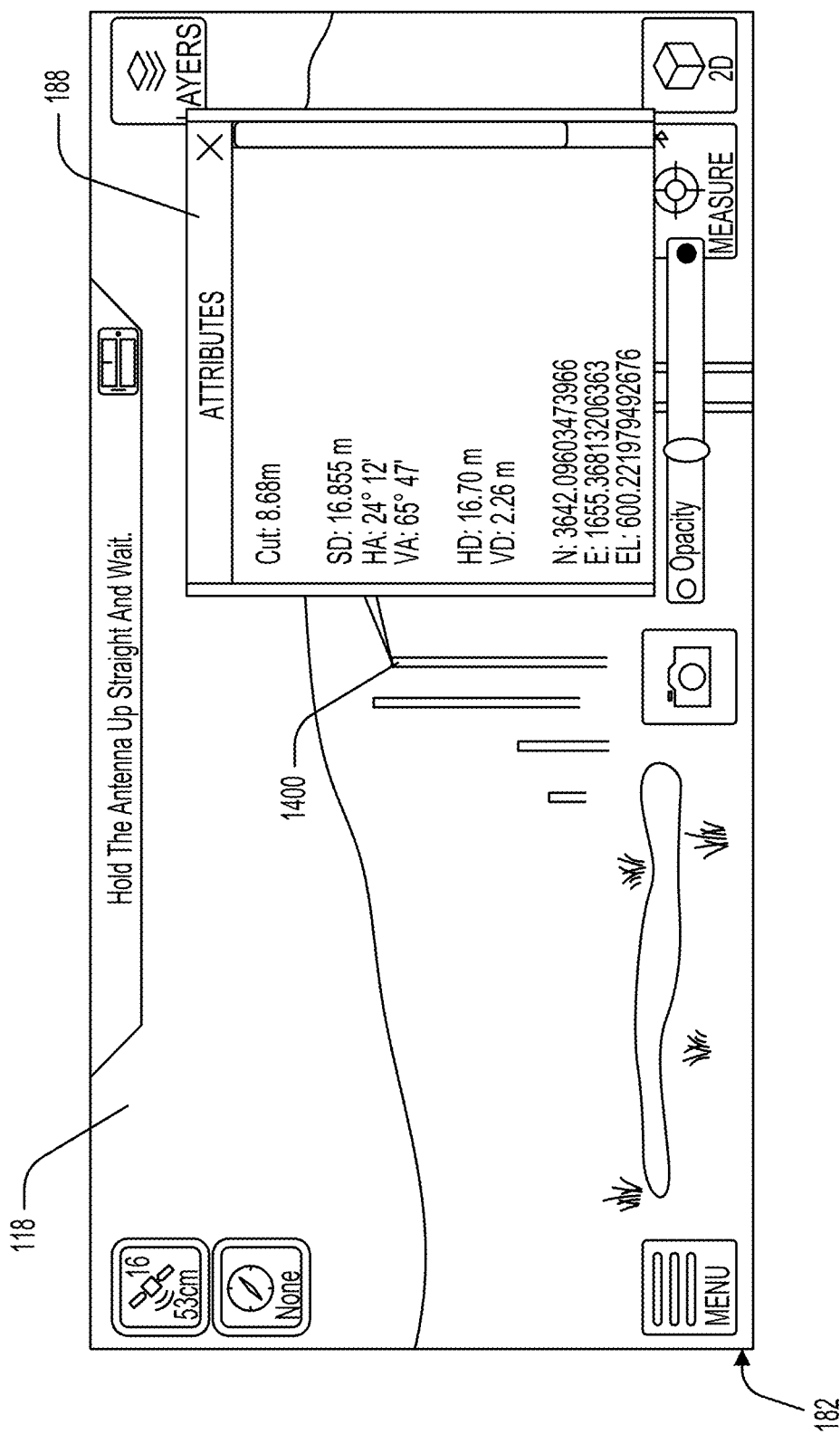
FIG. 14 illustrates an example of a superimposed image showing the calculation of a geospatial position of a point of interest that may be displayed by an AR device, according to some embodiments of the present invention.

FIG. 14 illustrates an example of superimposed image 182 showing the calculation of a geospatial position of a point of interest that may be displayed by AR device 100, according to some embodiments of the present invention. In the illustrated embodiment, superimposed image 182 is composed of a camera image 118 showing a construction site with a point of interest 1400 at the top of an object at the construction site. Superimposed image 182 further includes an information image 188 showing the slope distance SD, the horizontal angle HA, the vertical angle VA, the horizontal distance HD, the vertical distance VD, and the geospatial position of the point of interest (indicated by "N", "E", and "EL", i.e., north, east, and elevation, respectively). In various embodiments, point of interest 1400 may be positioned on a real-world object or may be positioned on model image 152 (e.g., on a 3D model).

Figure 15:
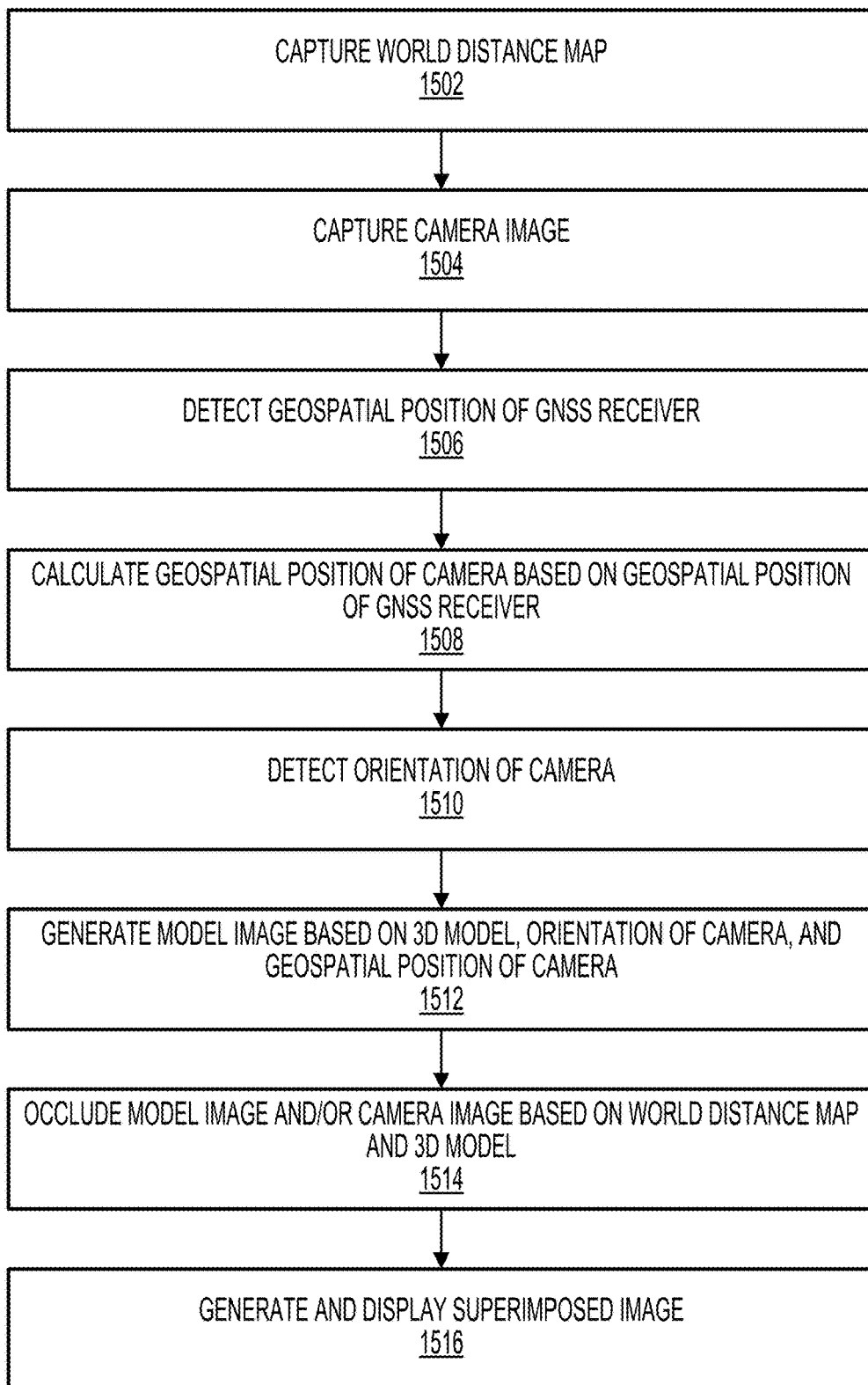
FIG. 15 illustrates a method for occluding displayable content on a portable electronic device, according to some embodiments of the present invention.

FIG. 15 illustrates a method 1500 for occluding displayable content on a portable electronic device, according to some embodiments of the present invention. Steps of method 1500 may be performed in any order, and not all steps of method 1500 need be performed. Method 1500 may be performed in response to AR device 100 receiving user input 122, in response to displaying an image of a 3D model, among other possibilities. Method 1500 may be performed by an AR device or a similar portable electronic device. For example, one or more steps of method 1500 may be performed by occlusion module 184.

At step 1502, a world distance map is captured by EDM device 146. The world distance map may include a plurality of distances to a plurality of points within the field of view of EDM device 146. The plurality of points may be positioned on various objects surrounding AR device 100. The distance map may include a grid of "pixels", each having a distance value of one of the plurality of distances.

At step 1504, camera image 118 may be captured by camera 116. Camera image 118 may contain all of the plurality of points (i.e., the objects on which the plurality of points are positioned) or a subset of the plurality of points.

At step 1506, the geospatial position of GNSS receiver 110 is detected. In some embodiments, GNSS receiver 110 receives GNSS signal 132 from one or more GNSS satellites (and optionally corrections signal 134) and generates GNSS position data 136 based on GNSS signal 132. GNSS position data 136 is received by data processor 138 which determines, based on GNSS position data 136, a geospatial position of GNSS receiver 110. In some embodiments, position/orientation module 168 determines the geospatial position.

At step 1508, the geospatial position of camera 116 is calculated based on the geospatial position of GNSS receiver 110. In some embodiments, calculating the geospatial position of camera 116 includes calculating an offset vector extending between the geospatial position of GNSS receiver 110 and the geospatial position of camera 116 based on a known relationship between the orientation of camera 116 and the offset vector. The known relationship may be an offset angle (e.g., 1 degree, 2 degrees, 5 degrees, 10 degrees, etc.). The magnitude (e.g., length) of the offset vector may be constant and may be determined upon manufacture of camera component 101 and sensor component 102. The geospatial position of camera 116 may calculated by modifying the geospatial position of GNSS receiver 110 with the offset vector. For example, the geospatial position of camera 116 may be calculated by summing the geospatial position of GNSS receiver 110 with the offset vector or by subtracting the offset vector from the geospatial position of GNSS receiver 110 (depending on the method of defining the orientation of the offset vector).

At step 1510, the orientation of camera 116 is detected. In some embodiments, detecting the orientation of camera 116 includes detecting an orientation of angle sensor 126 and determining the orientation of camera 116 based on the orientation of angle sensor 126. In some embodiments, the orientation of camera 116 and the orientation of angle sensor 126 are related by a known relationship, such as an offset angle (e.g., 1 degree, 2 degrees, 5 degrees, 10 degrees, etc.). The known relationship may be determined upon manufacture of camera component 101. In some embodiments, the orientation of camera 116 may include one or more horizontal angles (angles with respect to horizontal reference lines) and a vertical angle (angle with respect to a vertical reference line). In some embodiments, step 1510 is performed prior to step 1508.

At step 1512, model image 152 is generated based on a 3D model, the orientation of camera 116 and the geospatial position of camera 116. For example, AR device may receive or generate model data 176 corresponding to the 3D model. Model data 176 may include the geospatial positions of the 3D model so that the 3D model may be 2D rendered onto model image 152 from the perspective of the geospatial position and the orientation of camera 116.

At step 1514, at least one of model image 152 and camera image 118 is occluded based on the world distance map and the 3D model. In some embodiments, the world distance map is compared to a model distance map to determine which portions of the images to occlude. The model distance map may correspond to model image 152 and may be generated comprising a plurality of distances between the position of camera 116 and the 3D model. The model distance map may include a grid of "pixels", each having a distance value of one of the plurality of distances. For portions of model image 152 in which there is no rendering of the 3D model, the model distance map may have high values or may include some indicator that the 3D model is not rendered at that pixel.

In some embodiments, the model distance map may be compared to the world distance map on a pixel-by-pixel comparison to determine which distance map has a greater (or lesser) value. In some instances, the image with the corresponding distance map having the greater value (i.e., being further from the position of camera 116) is occluded. For example, for a particular pixel for which the model distance map has a value of 10 and the world distance map has a value of 11, camera image 118 may be occluded at that pixel. As another example, for a particular pixel for which the model distance map has a value of 20 and the world distance map has a value of 15, model image 152 may be occluded at that pixel. In some embodiments, occluding a portion of one of the images may include deleting or removing that portion of the image. In some embodiments, occluding a portion of one of the images may include displaying the other image on top of the occluded image (as part of superimposed image 182). In some embodiments, occlusion may be performed by generating one or both of an image occlusion mask and a model occlusion mask and applying one or both of the masks to camera image 118 and/or model image 152, respectively.

In some embodiments, the world distance map may be corrected so that the reference point is changed from the geospatial position of EDM device 146 to the geospatial position of camera 118. In some embodiments, this may include using the third offset vector ($X_{O3}, Y_{O3}, Z_{O3}$) to transform the world distance map to be referenced from the geospatial position of camera 118. In some embodiments, the geospatial positions of the plurality of points of the world distance map are calculated using method 1200 and the corrected world distance map is generated based on the calculated geospatial positions and the geospatial position of camera 118.

Figure 16A:
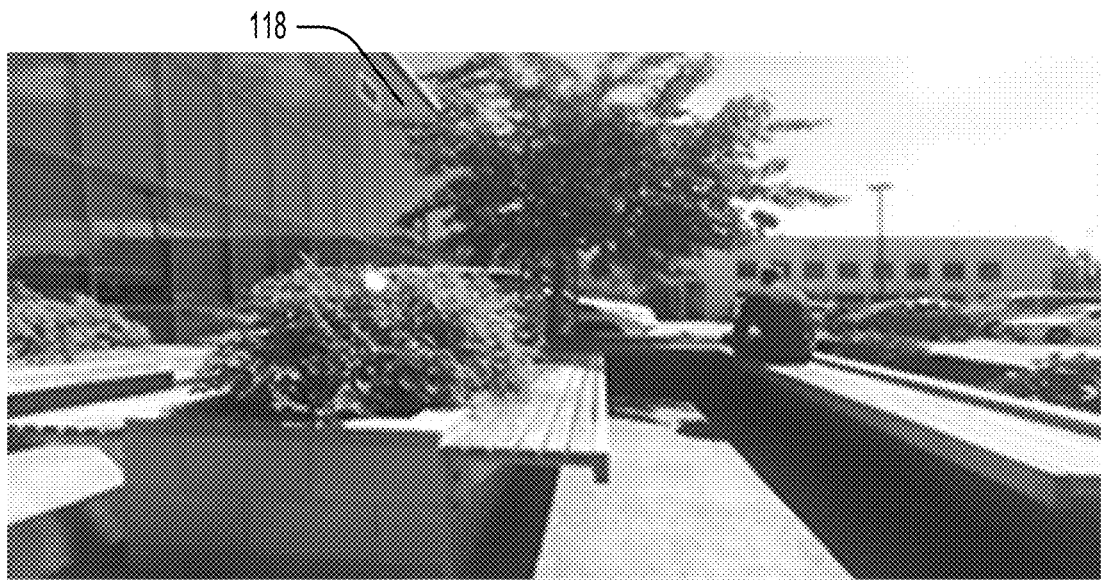
FIGS. 16A-16D illustrate examples of various steps of a method, according to some embodiments of the present invention.
Figure 16B:
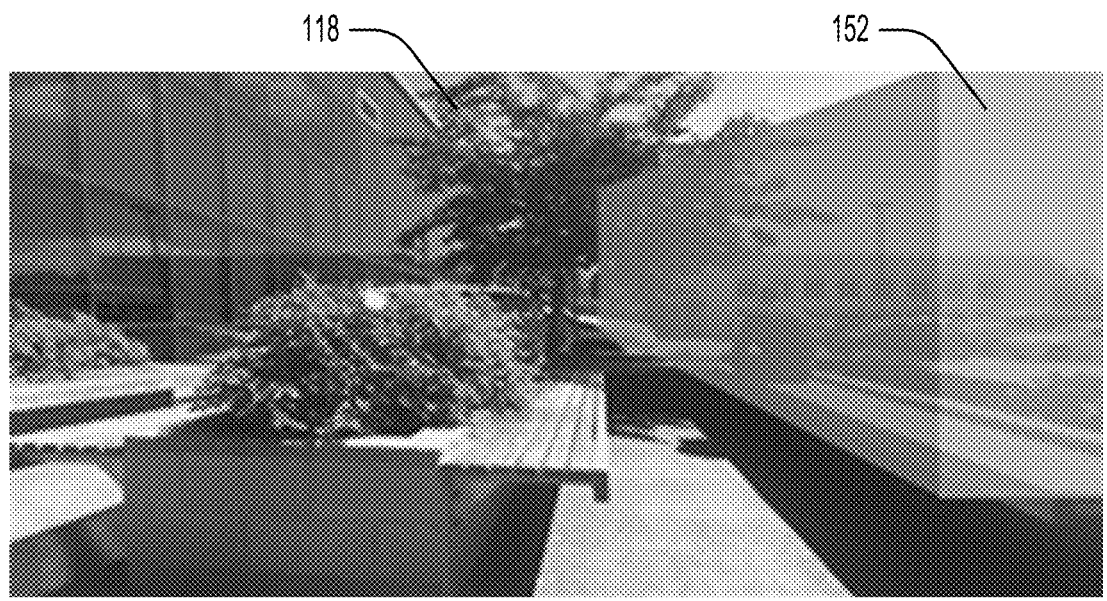
Figure 16C:
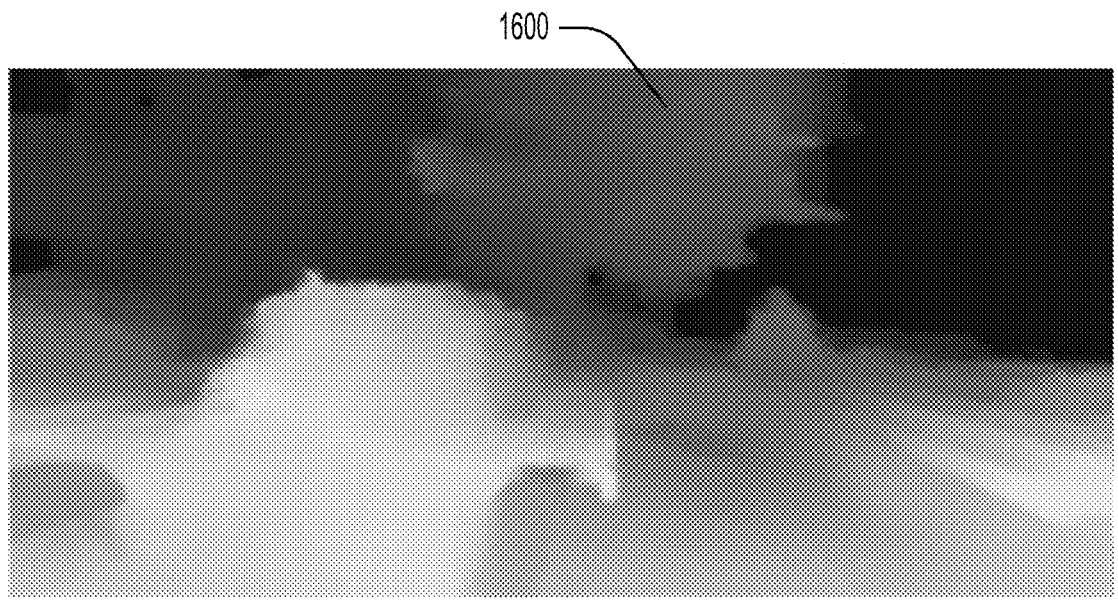
Figure 16D:
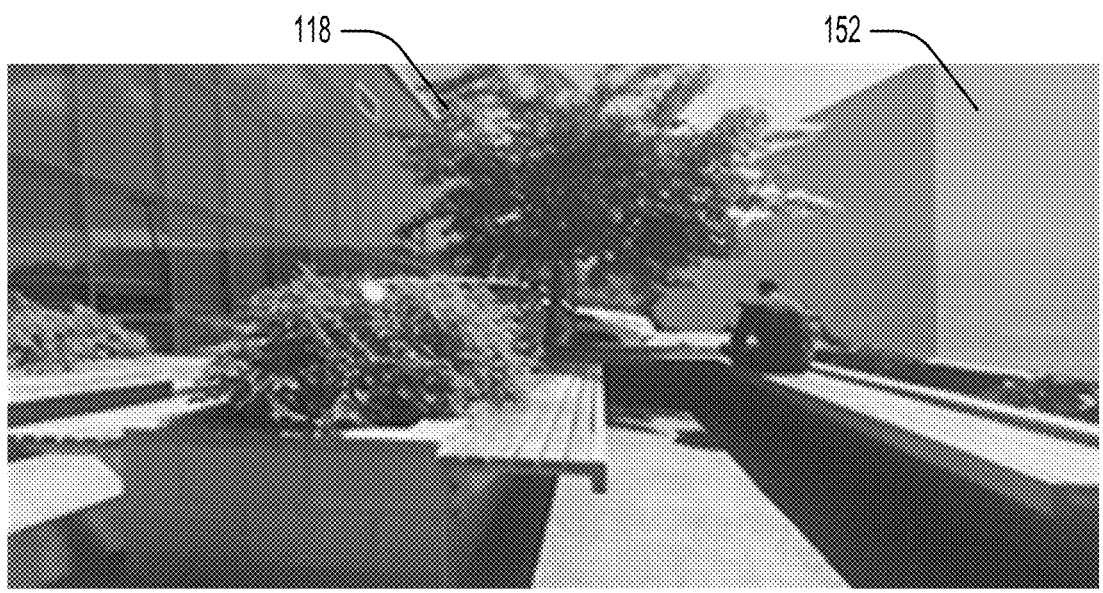

FIGS. 16A-16D illustrate examples of various steps of method 1500. FIG. 16A illustrates an example of camera image 118 depicting an outdoor scene, according to some embodiments of the present invention. FIG. 16B illustrates an example of model image 152 displayed on top of camera image 118. Model image 152 is partially transparent to show a comparison between the images. FIG. 16C illustrates an example of a world distance map 1600 captured by EDM device 146. FIG. 16D illustrates an example of a superimposed image in which portions of model image 152 have been occluded.

Figure 17:
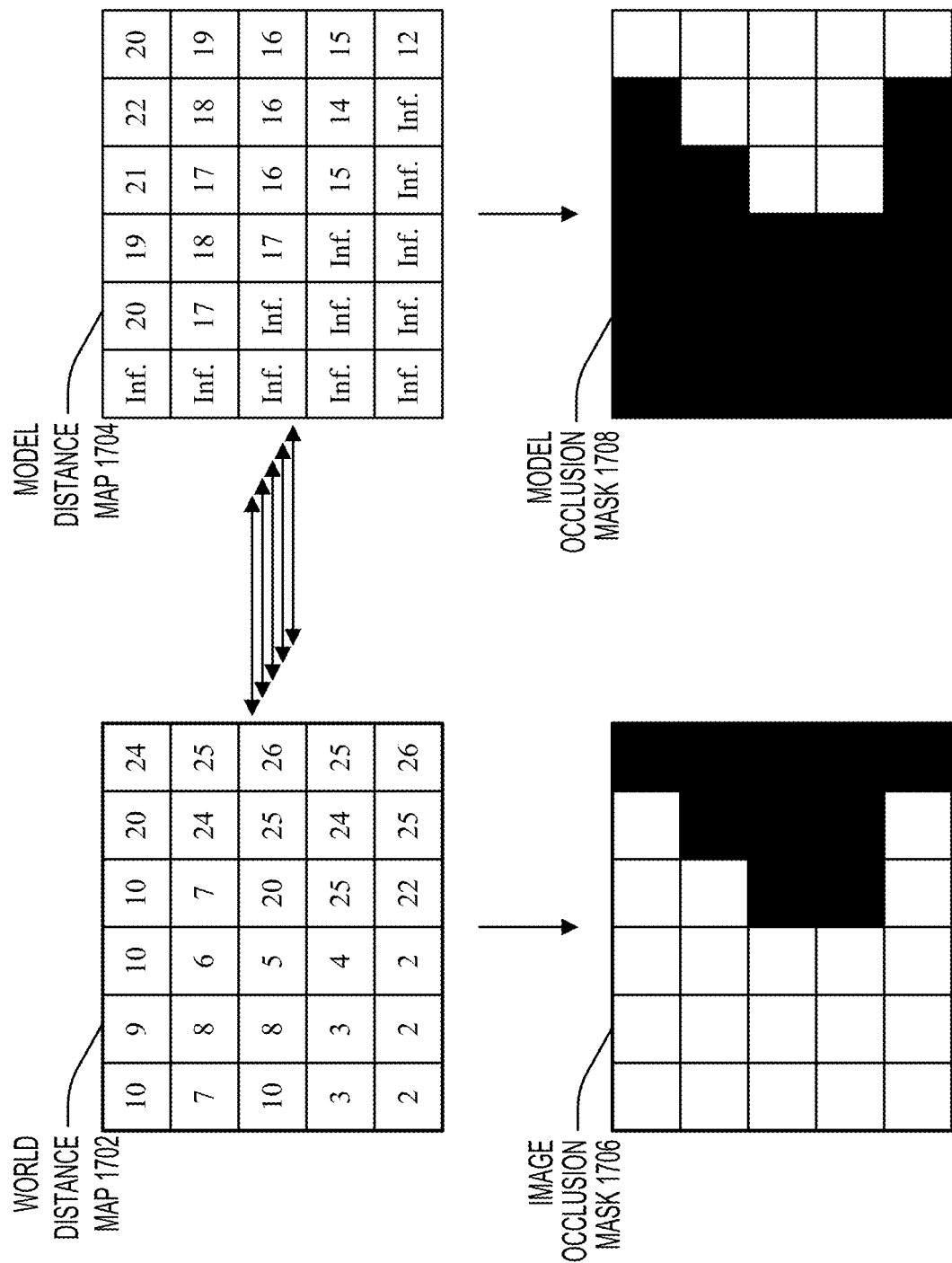
FIG. 17 illustrates examples of a world distance map, a model distance map, an image occlusion mask, and a model occlusion mask, according to some embodiments of the present invention.

FIG. 17 illustrates examples of a world distance map 1702, a model distance map 1704, an image occlusion mask 1706, and a model occlusion mask 1708, according to some embodiments of the present invention. In the illustrated embodiment, world distance map 1702 and model distance map 1704 each comprise 30 distance values arranged in a 5×6 grid. The distance values of model distance map 1704 in which there is no rendering of the 3D model are set to a value indicating "infinity". At each corresponding distance value, the distance value for world distance map 1702 is compared to the distance value for model distance map 1704 to determine which is greater. The results of the comparison are provided in image occlusion mask 1706 and/or model occlusion mask 1708.

In the illustrated embodiment, image occlusion mask 1706 comprises 30 binary values arranged in a 5×6 grid. If the corresponding distance value of world distance map 1702 is less than the corresponding distance value of model distance map 1704, the binary value in image occlusion mask 1706 is set equal to 1. If the corresponding distance value of world distance map 1702 is greater than the corresponding distance value of model distance map 1704, the binary value in image occlusion mask 1706 is set equal to 0. Similarly, model occlusion mask 1708 comprises 30 binary values arranged in a 5×6 grid. If the corresponding distance value of model distance map 1704 is less than the corresponding distance value of world distance map 1702, the binary value in model occlusion mask 1708 is set equal to 1. If the corresponding distance value of model distance map 1704 is greater than the corresponding distance value of world distance map 1702, the binary value in model occlusion mask 1708 is set equal to 0.

Image occlusion mask 1706 may be used to modify camera image 118 by, for example, multiplying image occlusion mask 1706 with camera image 118. Similarly, model occlusion mask 1708 may be used to modify model image 152 by, for example, multiplying model occlusion mask 1708 with model image 152. Because image occlusion mask 1706 and model occlusion mask 1708 are related (one is the inverse of the other), in some embodiments only one of the occlusion masks is calculated.

Figure 18:
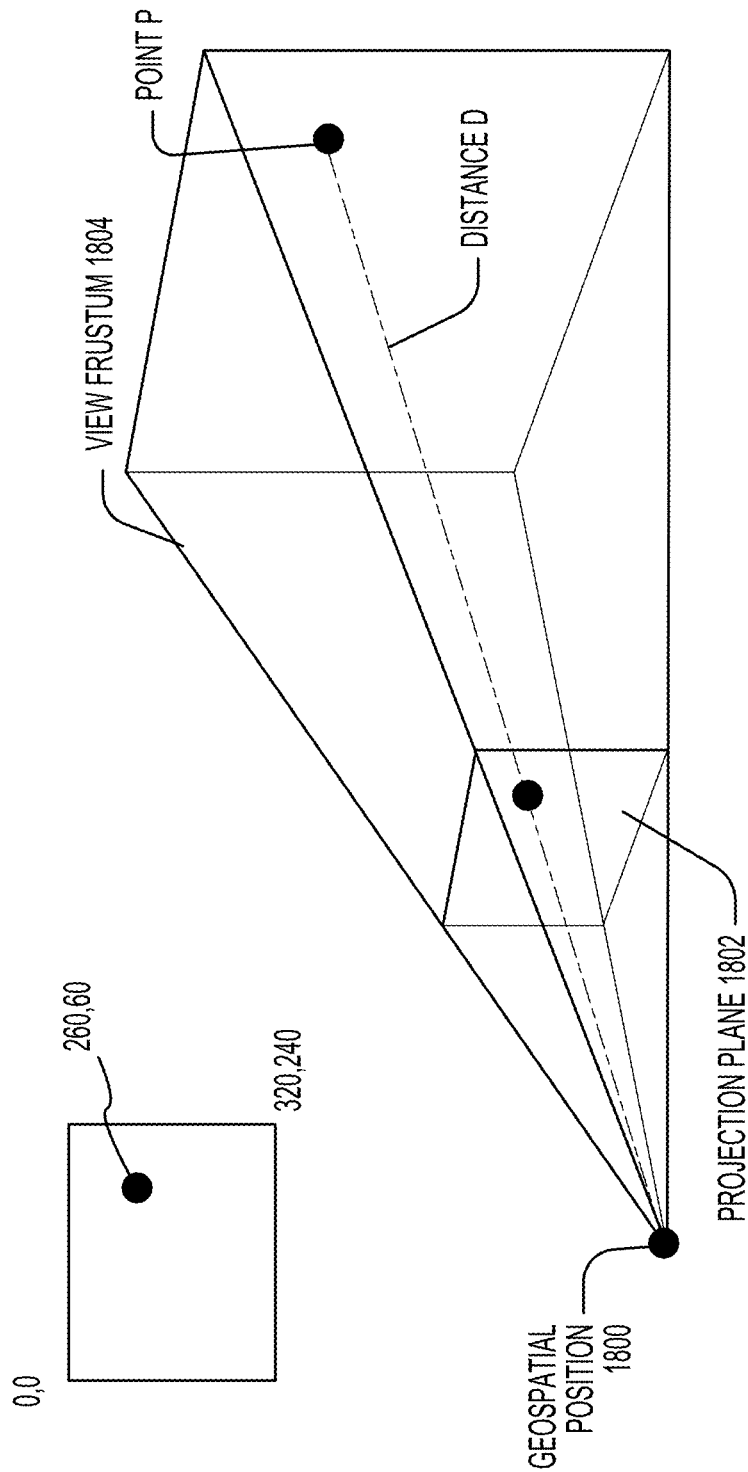
FIG. 18 illustrates an example of a technique for computing a distance map, according to some embodiments of the present invention.

FIG. 18 illustrates an example of a technique for computing a distance map, according to some embodiments of the present invention. A distance D is calculated between a geospatial position 1800 and a point P. Any point within a view frustum 1804 can be projected back onto a projection plane 1802 to generate a position (x,y) within projection plane 1802. The projection plane can then be converted into an image. In the illustrated embodiment, the image is set to be 320×240 pixels, and the value of distance D is encoded into the image at the position at which distance D intersects projection plane 1802. These steps are repeated for every detected distance value, thereby building up a distance map using every pixel in a scan.

Figure 19:
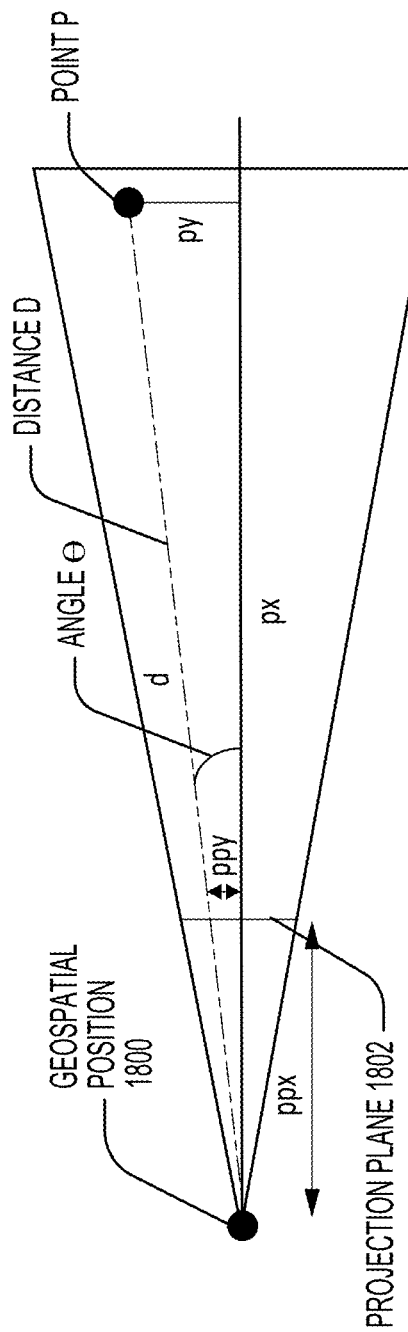
FIG. 19 illustrates a side view of an example of a technique for computing a distance map, according to some embodiments of the present invention.

FIG. 19 illustrates a side view of an example of a technique for computing a distance map, according to some embodiments of the present invention. As illustrated, using standard trigonometry functions, the position at which distance D intersects projection plane 1802 may be calculated given distance D, angle Θ, and the distance to the projection plane ppx.

Figure 20A:
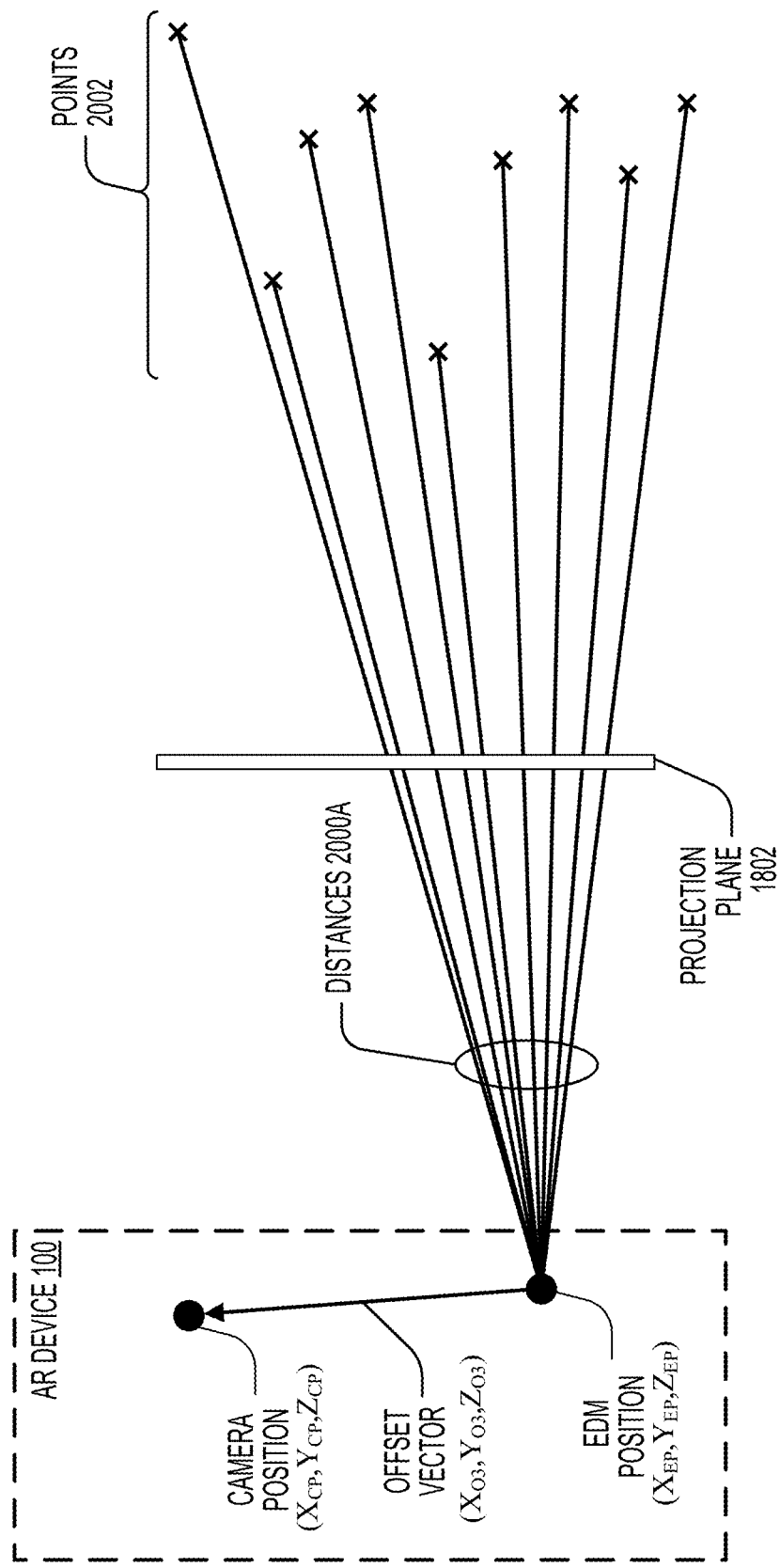
FIGS. 20A and 20B illustrates an example of a technique for correcting a world distance map, according to some embodiments of the present invention.
Figure 20B:
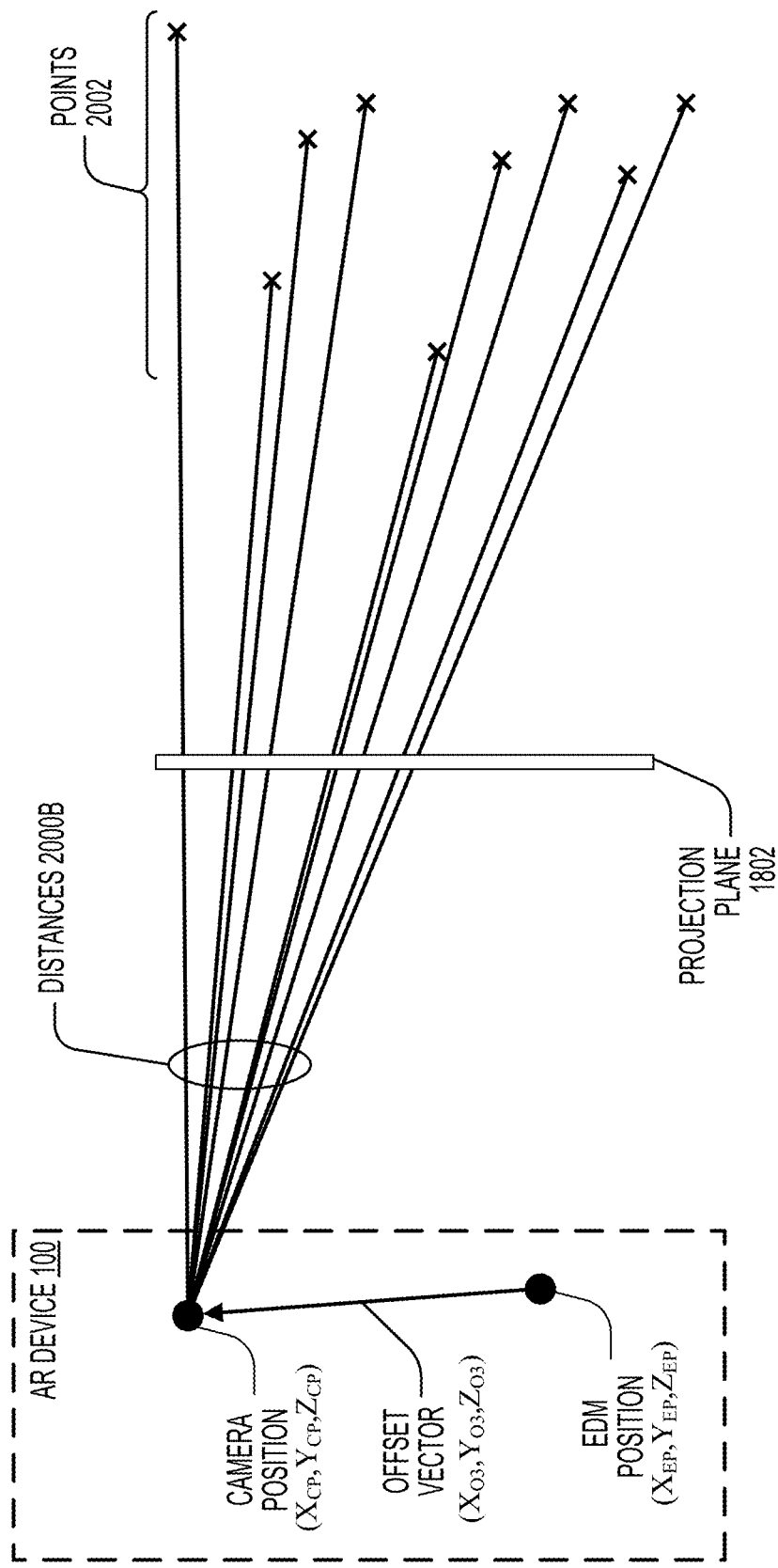

FIGS. 20A and 20B illustrates an example of a technique for correcting the world distance map so that the reference point is changed from the geospatial position of EDM device 146 to the geospatial position of camera 118, according to some embodiments of the present invention. In some embodiments, this may include using the third offset vector $(X_{O3}, Y_{O3}, Z_{O3})$ to transform the world distance map to be referenced from the geospatial position of camera 118. In some embodiments, the geospatial positions of the plurality of points of the world distance map are calculated (e.g., using method 1200) and the corrected world distance map is generated based on the calculated geospatial positions and the geospatial position of camera 118. As shown in FIGS. 20A and 20B, correcting the world distance map can cause distances 2000 as well as the intersection positions of distances 2000 into projection plane 1802 to change significantly while points 2002 remain the same.

Figure 21:
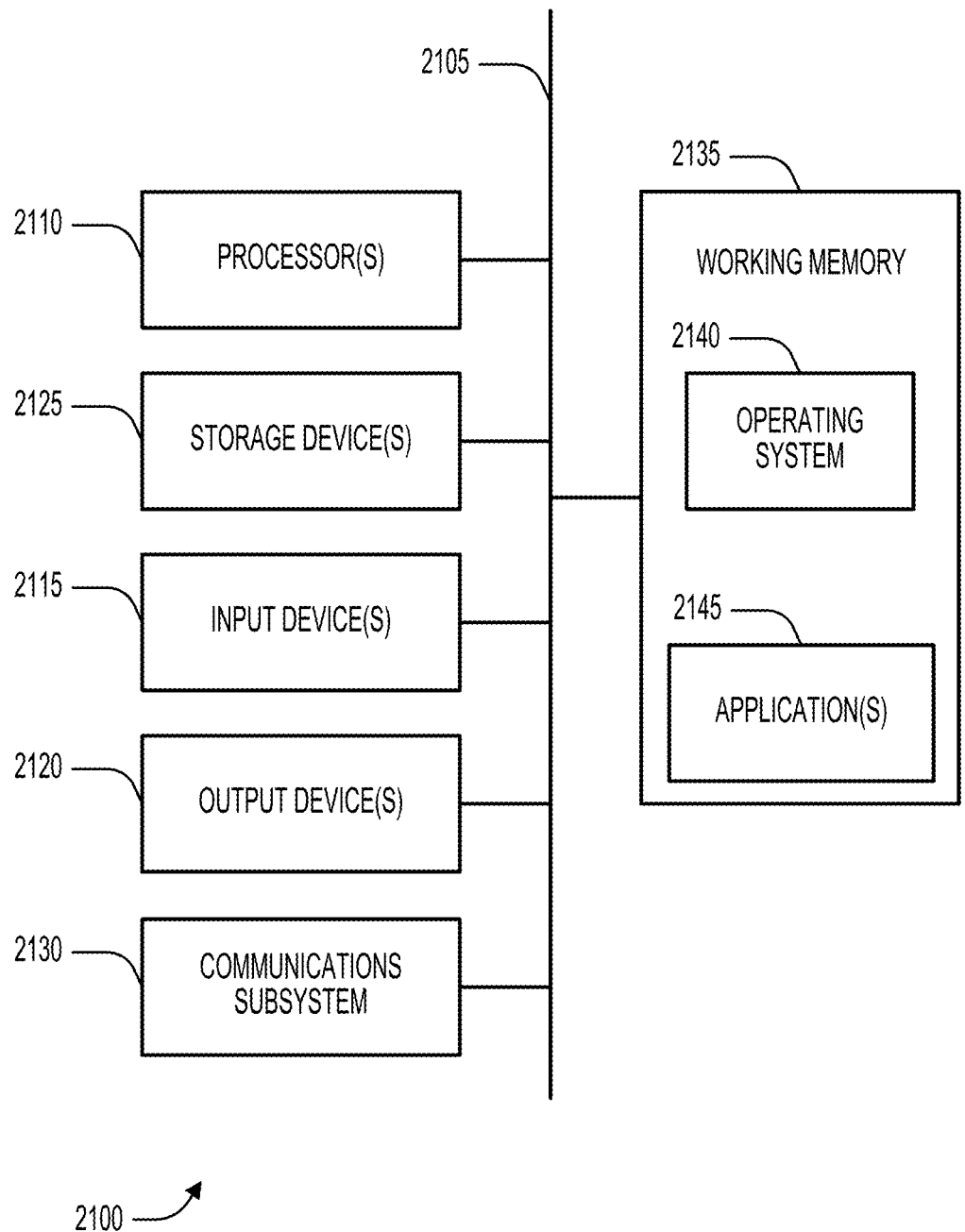
FIG. 21 illustrates a simplified computer system, according to some embodiments of the present invention.

FIG. 21 illustrates a simplified computer system 2100, according to some embodiments of the present invention. Computer system 2100 as illustrated in FIG. 21 may be incorporated into devices such as camera component 101, sensor component 102, or some other device described herein. FIG. 21 provides a schematic illustration of one embodiment of computer system 2100 that can perform some or all of the steps of the methods provided by various embodiments. It should be noted that FIG. 21 is meant only to provide a generalized illustration of various components, any or all of which may be utilized as appropriate. FIG. 21, therefore, broadly illustrates how individual system elements may be implemented in a relatively separated or more integrated manner.

Computer system 2100 is shown comprising hardware elements that can be electrically coupled via a bus 2105, or may otherwise be in communication, as appropriate. The hardware elements may include one or more processors 2110, including without limitation one or more general-purpose processors and/or one or more special-purpose processors such as digital signal processing chips, graphics acceleration processors, and/or the like; one or more input devices 2115, which can include, without limitation a mouse, a keyboard, a camera, and/or the like; and one or more output devices 2120, which can include, without limitation a display device, a printer, and/or the like.

Computer system 2100 may further include and/or be in communication with one or more non-transitory storage devices 2125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 2100 might also include a communications subsystem 2130, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 2130 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 2130. In other embodiments, a portable electronic device, e.g. the first electronic device, may be incorporated into computer system 2100, e.g., an electronic device as an input device 2115. In some embodiments, computer system 2100 will further comprise a working memory 2135, which can include a RAM or ROM device, as described above.

Computer system 2100 also can include software elements, shown as being currently located within the working memory 2135, including an operating system 2140, device drivers, executable libraries, and/or other code, such as one or more application programs 2145, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 2125 described above. In some cases, the storage medium might be incorporated within a computer system, such as computer system 2100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 2100 and/or might take the form of source and/or installable code, which, upon compilation and/or installation on computer system 2100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 2100 to perform methods in accordance with various embodiments of the technology. According to a set of embodiments, some or all of the procedures of such methods are performed by computer system 2100 in response to processor 2110 executing one or more sequences of one or more instructions, which might be incorporated into the operating system 2140 and/or other code, such as an application program 2145, contained in the working memory 2135. Such instructions may be read into the working memory 2135 from another computer-readable medium, such as one or more of the storage device(s) 2125. Merely by way of example, execution of the sequences of instructions contained in the working memory 2135 might cause the processor(s) 2110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 2100, various computer-readable media might be involved in providing instructions/code to processor(s) 2110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 2125. Volatile media include, without limitation, dynamic memory, such as the working memory 2135.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 2110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 2100.

The communications subsystem 2130 and/or components thereof generally will receive signals, and the bus 2105 then might carry the signals and/or the data, instructions, etc. carried by the signals to the working memory 2135, from which the processor(s) 2110 retrieves and executes the instructions. The instructions received by the working memory 2135 may optionally be stored on a non-transitory storage device 2125 either before or after execution by the processor(s) 2110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for occluding displayable content on a portable electronic device, the method comprising:
    capturing, by an electronic distance measuring (EDM) device of the portable electronic device, a world distance map comprising a plurality of distances to a plurality of points;
    capturing, by a camera of the portable electronic device, a camera image containing the plurality of points;

detecting a geospatial position of a global navigation satellite system (GNSS) receiver;
detecting an orientation of the camera;
calculating a geospatial position of the camera based on the geospatial position of the GNSS receiver and an offset vector that extends between the geospatial position of the GNSS receiver and the geospatial position of the camera, wherein the offset vector is calculated based on the orientation of the camera, wherein calculating the geospatial position of the camera includes (i) maintaining an augmented reality (AR) frame in which a set of AR points are defined, (ii) maintaining a geospatial frame in which a set of GNSS points are defined, and (iii) synchronizing the AR frame with the geospatial frame by:
  determining a first GNSS point within the GNSS frame at a first GNSS time and a second GNSS point within the GNSS frame at a second GNSS time, the first GNSS point and the second GNSS point forming a GNSS vector;
  determining a first AR point within the AR frame at a first AR time and a second AR point within the AR frame at a second AR time, the first AR point and the second AR point forming an AR vector;
  shifting the AR frame or the geospatial frame to align the second GNSS point with the second AR point; and
  rotating the AR frame or the geospatial frame to align the GNSS vector with the AR vector;
generating a model image based on a three-dimensional (3D) model, the orientation of the camera, and the geospatial position of the camera;
generating a model distance map comprising a plurality of distances to the 3D model;
generating a model occlusion mask by comparing each of the plurality of distances of the model distance map to a respective one of the plurality of distances of the world distance map, the model occlusion mask having a plurality of binary values;
occluding a portion of the model image by applying the model occlusion mask to the model image;
generating a superimposed image comprising the camera image and the model image; and
displaying the superimposed image.

2. The method of claim 1, wherein the portable electronic device is an AR device.

3. The method of claim 1, further comprising:
receiving model data corresponding to the 3D model, wherein the model data includes at least one geospatial position associated with the 3D model.

4. The method of claim 1, wherein the portable electronic device comprises a camera component including the camera and a sensor component including the EDM device and the GNSS receiver, and wherein the camera component is separable from and configured to removably attach to the sensor component.

5. The method of claim 4, wherein calculating the geospatial position of the camera based on the geospatial position of the GNSS receiver includes:
calculating the offset vector based on a known relationship between the orientation of the camera and the offset vector; and
calculating the geospatial position of the camera by modifying the geospatial position of the GNSS receiver with the offset vector.

6. The method of claim 4, wherein detecting the orientation of the EDM device includes:
detecting, by the angle sensor of the portable electronic device, an orientation of the angle sensor, wherein the angle sensor is positioned within the camera component; and
determining the orientation of the camera based on the orientation of the angle sensor and based on a known relationship between the orientation of the angle sensor and the orientation of the camera.

7. A portable electronic device configured to occlude displayable content, the portable electronic device comprising:
an electronic distance measuring (EDM) device configured to capture a world distance map comprising a plurality of distances to a plurality of points;
a camera configured to capture a camera image containing the plurality of points;
a global navigation satellite system (GNSS) receiver configured to detect a geospatial position of the GNSS receiver;
an angle sensor configured to detect an orientation of the angle sensor; and
one or more processors communicatively coupled to the camera, the EDM device, and the GNSS receiver, wherein the one or more processors are configured to perform operations comprising:
  calculating an orientation of the camera based on the orientation of the angle sensor;
  calculating a geospatial position of the camera based on the geospatial position of the GNSS receiver and an offset vector that extends between the geospatial position of the GNSS receiver and the geospatial position of the camera, wherein the offset vector is calculated based on the orientation of the camera, wherein calculating the geospatial position of the camera includes (i) maintaining an augmented reality (AR) frame in which a set of AR points are defined, (ii) maintaining a geospatial frame in which a set of GNSS points are defined, and (iii) synchronizing the AR frame with the geospatial frame by:
    determining a first GNSS point within the GNSS frame at a first GNSS time and a second GNSS point within the GNSS frame at a second GNSS time, the first GNSS point and the second GNSS point forming a GNSS vector;
    determining a first AR point within the AR frame at a first AR time and a second AR point within the AR frame at a second AR time, the first AR point and the second AR point forming an AR vector;
    shifting the AR frame or the geospatial frame to align the second GNSS point with the second AR point; and
    rotating the AR frame or the geospatial frame to align the GNSS vector with the AR vector;
  generating a model image based on a three-dimensional (3D) model, the orientation of the camera, and the geospatial position of the camera;
  generating a model distance map comprising a plurality of distances to the 3D model;
  generating a model occlusion mask by comparing each of the plurality of distances of the model distance map to a respective one of the plurality of distances of the world distance map, the model occlusion mask having a plurality of binary values;
  occluding a portion of the model image by applying the model occlusion mask to the model image;

generating a superimposed image comprising the camera image and the model image; and
displaying the superimposed image.

8. The portable electronic device of claim 7, wherein the portable electronic device is an AR device.

9. The portable electronic device of claim 7, wherein the operations further comprise:
receiving model data corresponding to the 3D model, wherein the model data includes at least one geospatial position associated with the 3D model.

10. The portable electronic device of claim 7, wherein the portable electronic device comprises a camera component including the camera and a sensor component including the EDM device and the GNSS receiver, and wherein the camera component is separable from and configured to removably attach to the sensor component.

11. The portable electronic device of claim 10, wherein calculating the geospatial position of the camera based on the geospatial position of the GNSS receiver includes:
calculating the offset vector based on a known relationship between the orientation of the camera and the offset vector; and
calculating the geospatial position of the camera by modifying the geospatial position of the GNSS receiver with the offset vector.

12. The portable electronic device of claim 10, wherein the angle sensor is positioned within the camera component, and wherein calculating the orientation of the camera includes:
calculating the orientation of the camera based on the orientation of the angle sensor and based on a known relationship between the orientation of the angle sensor and the orientation of the camera.

13. A sensor component configured to removably attach to a camera component and to occlude displayable content, the sensor component comprising:
an electronic distance measuring (EDM) device configured to capture a world distance map comprising a plurality of distances to a plurality of points; and
a global navigation satellite system (GNSS) receiver configured to detect a geospatial position of the GNSS receiver;
wherein, when the sensor component is removably attached to the camera component including one or more processors, the one or more processors are configured to perform operations comprising:
capturing, by a camera of the camera component, a camera image containing the plurality of points;
detecting, by an angle sensor of the camera component, an orientation of the angle sensor;
calculating an orientation of the camera based on the orientation of the angle sensor;
calculating a geospatial position of the camera based on the geospatial position of the GNSS receiver and an offset vector that extends between the geospatial position of the GNSS receiver and the geospatial position of the camera, wherein the offset vector is calculated based on the orientation of the camera, wherein calculating the geospatial position of the camera includes (i) maintaining an augmented reality (AR) frame in which a set of AR points are defined, (ii) maintaining a geospatial frame in which a set of GNSS points are defined, and (iii) synchronizing the AR frame with the geospatial by:
determining a first GNSS point within the GNSS frame at a first GNSS time and a second GNSS point within the GNSS frame at a second GNSS time, the first GNSS point and the second GNSS point forming a GNSS vector;
determining a first AR point within the AR frame at a first AR time and a second AR point within the AR frame at a second AR time, the first AR point and the second AR point forming an AR vector;
shifting the AR frame or the geospatial frame to align the second GNSS point with the second AR point; and
rotating the AR frame or the geospatial frame to align the GNSS vector with the AR vector;
generating a model image based on a three-dimensional (3D) model, the orientation of the camera, and the geospatial position of the camera;
generating a model distance map comprising a plurality of distances to the 3D model;
generating a model occlusion mask by comparing each of the plurality of distances of the model distance map to a respective one of the plurality of distances of the world distance map, the model occlusion mask having a plurality of binary values;
occluding a portion of the model image by applying the model occlusion mask to the model image;
generating a superimposed image comprising the camera image and the model image; and
displaying the superimposed image.

14. The sensor component of claim 13, wherein the sensor component and the camera component, when attached, form an AR device.

15. The sensor component of claim 13, wherein the operations further comprise:
receiving model data corresponding to the 3D model, wherein the model data includes at least one geospatial position associated with the 3D model.

16. The sensor component of claim 13, wherein calculating the geospatial position of the camera based on the geospatial position of the GNSS receiver includes:
calculating the offset vector based on a known relationship between the orientation of the camera and the offset vector; and
calculating the geospatial position of the camera by modifying the geospatial position of the GNSS receiver with the offset vector.

17. The sensor component of claim 13, wherein calculating the orientation of the camera includes:
calculating the orientation of the camera based on the orientation of the angle sensor and based on a known relationship between the orientation of the angle sensor and the orientation of the camera.

* * * * *